United States Patent [19]

Ogata

[11] Patent Number: 5,283,665
[45] Date of Patent: Feb. 1, 1994

[54] FACSIMILE APPARATUS

[75] Inventor: Yukihiko Ogata, Tokyo, Japan

[73] Assignee: Canon Kabushiki Kaisha, Tokyo, Japan

[21] Appl. No.: 554,725

[22] Filed: Jul. 19, 1990

[30] Foreign Application Priority Data

Jul. 20, 1989 [JP] Japan ................................. 1-186111
Jul. 25, 1989 [JP] Japan ................................. 1-190624

[51] Int. Cl.$^5$ ............................................. H04N 1/00
[52] U.S. Cl. .................................... 358/434; 358/402; 358/405; 358/407; 358/435; 358/436; 358/440
[58] Field of Search ............... 358/400, 401, 402, 403, 358/404, 405, 406, 407, 434, 435, 436, 438, 439, 440, 442, 443, 444; 379/100

[56] References Cited

U.S. PATENT DOCUMENTS

| | | | |
|---|---|---|---|
| 4,994,926 | 2/1991 | Gordon et al. | 358/402 |
| 5,003,405 | 3/1991 | Wulforst | 358/402 |
| 5,065,254 | 11/1991 | Hishida | 358/400 |
| 5,091,790 | 2/1992 | Silverberg | 358/440 |
| 5,155,601 | 10/1992 | Toyama | 358/401 |

FOREIGN PATENT DOCUMENTS 59-57571 4/1984 Japan ................................. 358/440
63-119365 5/1988 Japan ................................. H04N 1/00

Primary Examiner—Edward L. Coles, Sr.
Assistant Examiner—Jerome Grant, II
Attorney, Agent, or Firm—Fitzpatrick, Cella, Harper & Scinto

[57] ABSTRACT

This disclosure relates to a facsimile apparatus connected to an ISDN and having a confirmation function by which an addressor is capable of confirming whether data transmitted by the addressor have reached the addressee with certainty. The apparatus on the transmitting side adds transmission management information to the transmission data and sends both the data and the additional information to an apparatus on the receiving side. Based on the received transmission management information, the apparatus on the receiving side responds by sending information indicating that it has assuredly received the data back to the apparatus on the transmitting side. Thus, transmission of the data is performed with assurance by exchange of management information between the apparatus on the transmitting and receiving sides. Also disclosed is a facsimile apparatus having a function in which a password on the receiving side is provided so that a specific individual can confirm certain receipt of data.

11 Claims, 25 Drawing Sheets

FIG. 4

IMAGE DATA RECEPTION MANAGEMENT TABLE ON RECEIVING SIDE — 209

| BOX NO. | PASSWORD | MANAGEMENT NO. | ADDRESSOR'S NO. | ADDRESSOR'S SHORTFORM NAME | ADDRESSOR'S BOX NO. | ADDRESSOR'S MANAGEMENT NO. | TIME 1 | TIME 2 | IMAGE INFORMATION STORAGE ADDRESS | COMMUNICATION MODE | MIS'C |
|---|---|---|---|---|---|---|---|---|---|---|---|
| 401 | 402 | 403 | 404 | 405 | 406 | 407 | 408 | 409 | 410 | 411 | 412 |

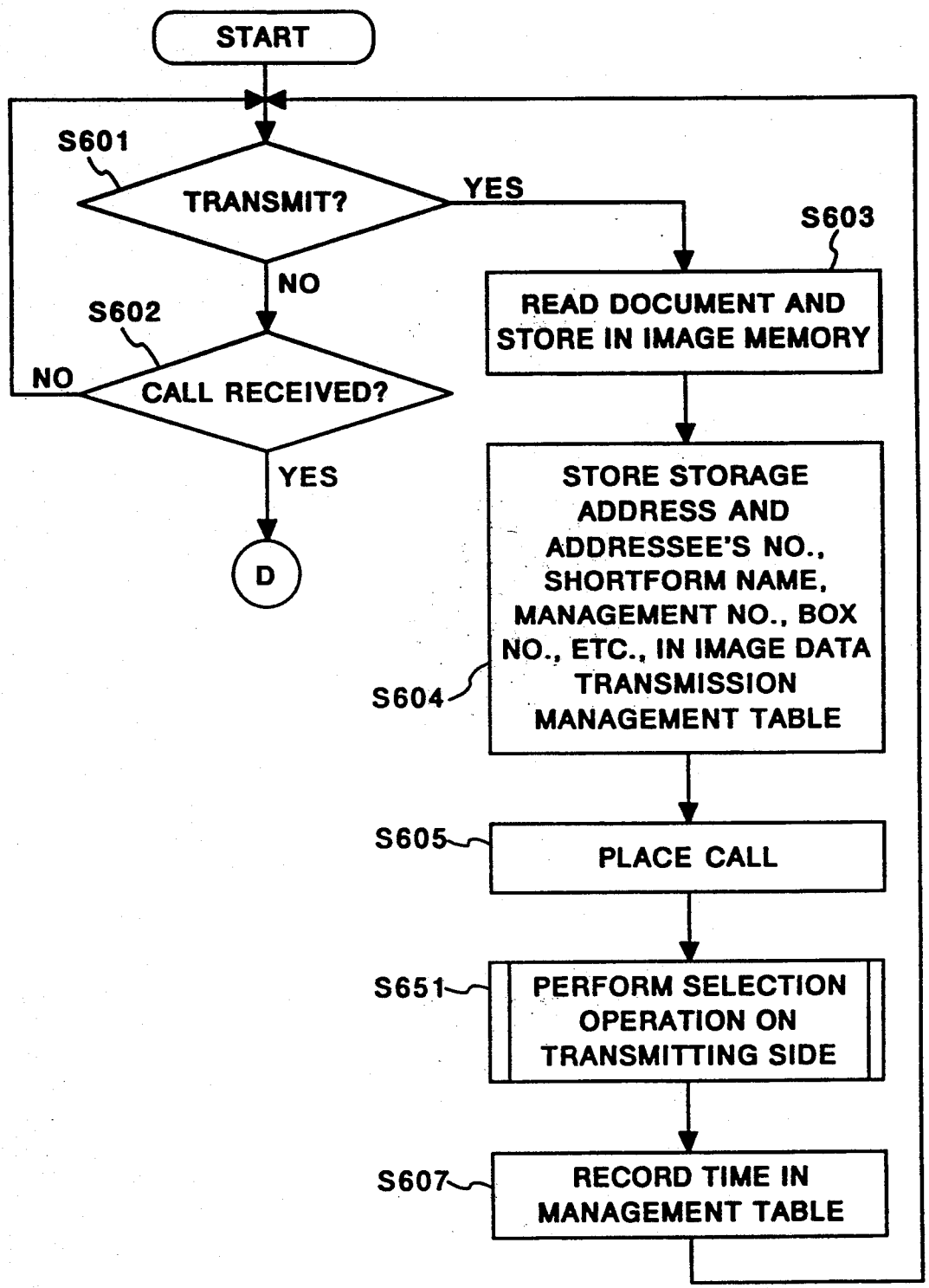
F I G. 14A

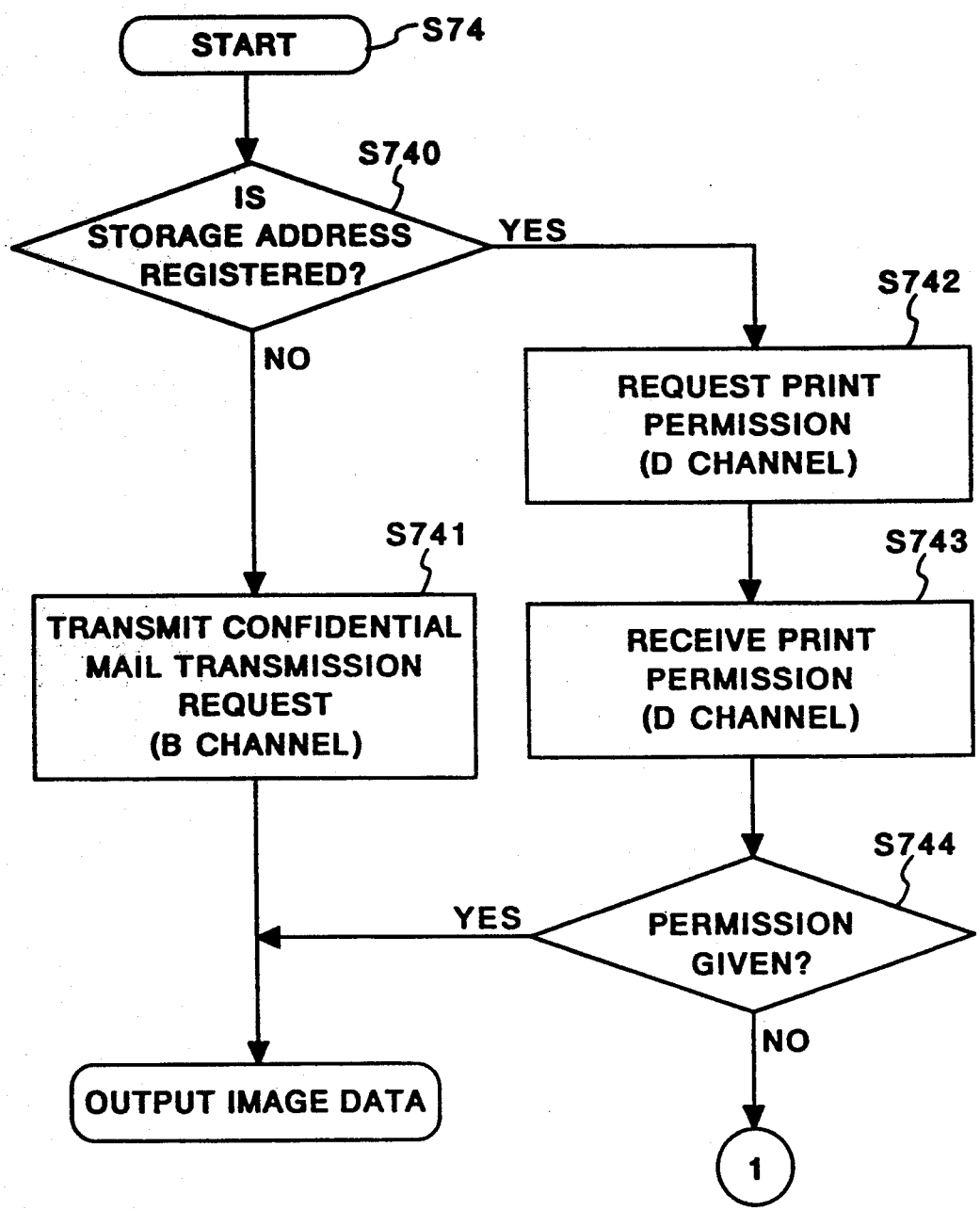
F I G. 17

FACSIMILE APPARATUS

BACKGROUND OF INVENTION

Field of Invention

This invention relates to a facsimile apparatus and, more particularly, to a facsimile apparatus connected to an ISDN.

The Prior Art

FIG. 19 illustrates a known prior-art example of reception control of mail (or confidential mail) in an electronic mailing system. In FIG. 19, a management table 1003 stores mailbox numbers used by addressees (in addition to passwords known solely to these addressees in the case of confidential mail) and registered in the table beforehand. The box numbers are known also to addressors in advance.

An apparatus 1001 on the transmitting side designates a box number and transmits image information indicative of mail (or confidential mail) via a communication line 1001. An apparatus 1102 on the receiving side stores the received image information in a mailbox (or confidential mailbox) 1002 at the location of the designated box number and stores this address as well as such transmission management information as the transmitting party (terminal) number and the addressor number in the management table 1003.

The apparatus 1101 on the transmitting side terminates all processing in response to completion of the transmission of image information. At this time the apparatus 1102 on the receiving side displays a message indicative of the box number and receipt of the mail (or confidential mail) and notifies the addressee. In response, the addressee inputs his own box number (in addition to a password when confidential mail is received). A retrieval unit 1004 performs a search of the registered data (and compares passwords in case of confidential mail) using the inputted data, and generates an output permission signal when the data searched for can be retrieved (and when compared passwords agree in case of confidential mail). In response to the output permission signal, the apparatus 1102 on the receiving side outputs (prints out) the image from the mailbox (or confidential mailbox) 1002.

Thus, the conventional apparatus on the transmitting side is entirely incapable of knowing what the circumstances are following completion of the transmission of image information. Consequently, the addressor is incapable of knowing whether the mail (or confidential mail) information has actually been acquired by the addressee. For example, the addressor cannot know whether the apparatus malfunctioned before the addressee obtained the image or whether the addressee forgot to print out the image. This can cause the addressor anxiety and therefore is undesirable in terms of handling important documents (especially confidential documents and the like).

In addition, there are cases where an image cannot be transmitted because the confidential mailbox of the apparatus on the receiving side is full. Forcing the addressor to wait in such cases is unreasonable.

SUMMARY OF THE INVENTION

An object of the present invention is to provide a facsimile apparatus in which it can be confirmed on the transmitting side that information has been acquired by the addressee.

According to the present invention, the foregoing object is attained by providing a facsimile apparatus connected to an ISDN, comprising memory means for storing image data as well as transmission management information corresponding to the image data, transmitting means for transmitting, to an apparatus on a receiving side, the image data as well as additional transmission information corresponding to the image data, and confirming means for confirming, after a transmission by the transmitting means, output of the image data to the apparatus on the receiving side based on output notification transmitted by the apparatus on the receiving side.

Further, the present invention provides a facsimile apparatus connected to an ISDN, comprising receiving means for receiving image data from an apparatus on a transmitting side as well as additional transmission information corresponding to the image data, memory means for storing the image data and the additional transmission information received by the receiving means, input means for inputting an output request for the image data, output means for outputting the corresponding image data in the memory means based upon the output request, for the image data, which is inputted from the input means, and the additional transmission information, and transmitting means which, in operative association with output of the image data by the output means, presents the apparatus on the transmitting side with output notification of the corresponding data based on the additional transmission information.

Another object of the present invention is to provide a facsimile apparatus in which it can be confirmed, on the transmitting side, that an addressee whose has been notified of transmission of confidential information has outputted this confidential information.

According to the present invention, this object is attained by providing a facsimile apparatus connected to an ISDN, comprising memory means for storing image data as well as transmission management information corresponding to the image data, transmitting means for transmitting as confidential information, to an apparatus on a receiving side, the image data as well as additional transmission information corresponding to the image data, and secrecy safeguard cancelling means for permitting output of the confidential information in the apparatus on the receiving side, based on an output permission request transmitted by the apparatus on the receiving side, after a transmission by the transmitting means.

Further, the invention provides a facsimile apparatus connected to an ISDN, comprising receiving means for receiving, from an apparatus on a transmitting side, image data designated as confidential information as well as additional transmission information corresponding to the image data, confidential information memory means for storing, as confidential information in a confidential mailbox, the image data and additional transmission information received by the receiving means, input means for inputting an image data output request corresponding to the additional transmission information, and confidential information output means for outputting the corresponding image data in the memory means based upon the image data output request, which is inputted from the input means, and the additional transmission information.

Still another object of the present invention is to provide a facsimile apparatus in which the transmitting side gives advance notice of the transmission of confidential information and the addressee sends a request to the transmitting side at any desired time to request transmission of the confidential information, whereby the confidential information can be received with certainty.

According to the present invention, this object is attained by providing a facsimile apparatus connected to an ISDN, comprising memory means for storing image data as well as transmission management information corresponding to the image data, notifying means for providing an apparatus on a receiving side with advance notice of a confidential information transmission to give advance notice of the fact that the image data to be transmitted is confidential information, and confidential information transmitting means for receiving a confidential information transmission request from the apparatus on the receiving side in response to notification by the notifying means, and transmitting image data corresponding to the transmission management information to the apparatus on the receiving side.

Further, there is provided a facsimile apparatus connected to an ISDN, comprising receiving means for receiving advance notice of a confidential information transmission from an apparatus on a transmitting side, memory means for storing the advance notice of confidential information transmission received by the receiving means, input means for inputting a transmission request for image data corresponding to the advance notice of confidential information transmission, confidential information transmission requesting means for requesting the apparatus on the transmitting side to transmit the corresponding image data based on an output request for the image data inputted from the input means and the advance notice of confidential information transmission stored in the memory means, and confidential information receiving means for receiving image data transmitted by the apparatus on the transmitting side as a response to the confidential information transmission request.

A further object of the present invention is to provide a facsimile apparatus in which, while taking account of remaining storage capacity of memory means of an apparatus on the receiving side, it is possible to simultaneously transmit, along with advance notice of a confidential information transmission, the corresponding confidential information when the remaining storage capacity is sufficient.

According to the present invention, this object is attained by providing a facsimile apparatus connected to an ISDN, comprising memory means for storing image data as well as transmission management information corresponding to the image data, transmitting means for transmitting, to an apparatus on a receiving side, the image data as well as advance notice of a confidential information transmission to give advance notice of the fact that the image data is confidential information, selecting means for selecting transmission data from the transmitting means in dependence upon remaining storage capacity of memory means of the apparatus on the receiving side, and print-output control means, which is responsive to a print permission request for printing of image data corresponding to the advance notice of confidential information transmission, or a confidential information transmission request, from the apparatus on the receiving side, for transmitting, to the apparatus on the receiving side, print permission notification corresponding to the print permission request or image data corresponding to the confidential information transmission request.

Further, the present invention provides a facsimile apparatus connected to an ISDN, comprising receiving means for receiving, from an apparatus on a transmitting side, advance notice of a confidential information transmission as well as image data corresponding to the advance notice of confidential information transmission, confidential information memory means for storing the advance notice of confidential information transmission and the image data received by the receiving means, input means for inputting an image data output request for image data corresponding to the advance notice of confidential information transmission, and confidential information output control means for controlling output of the corresponding image data based upon the image data output request inputted by the input means and the advance notice of confidential information transmission stored in the confidential information memory means.

In accordance with the present invention as described above, an addressor is capable of ascertaining that an addressee has acquired mail or confidential information with certainty.

The invention is particularly advantageous since the circumstances for transmission to a plurality of addressees can be confirmed en masse when broadcasting or confidential broadcasting is performed.

Other features and advantages of the present invention will be apparent from the following description taken in conjunction with the accompanying drawings, in which like reference characters designate the same or similar parts throughout the FIGURES thereof.

BRIEF DESCRIPTION OF THE DRAWINGS

FIG. 4 is a diagram showing data stored in an image data reception management table of the facsimile apparatus constituting the preferred embodiment of the invention;

FIGS. 14A, 14B and 14C are flowcharts showing a communication protocol of an apparatus on the transmitting side in a fourth embodiment;

FIG. 17 is a flowchart showing a selection operation on the receiving side;

DESCRIPTION OF THE PREFERRED EMBODIMENTS

Preferred embodiments of the present invention will now be described in detail in accordance with the accompanying drawings.

Figure 1:
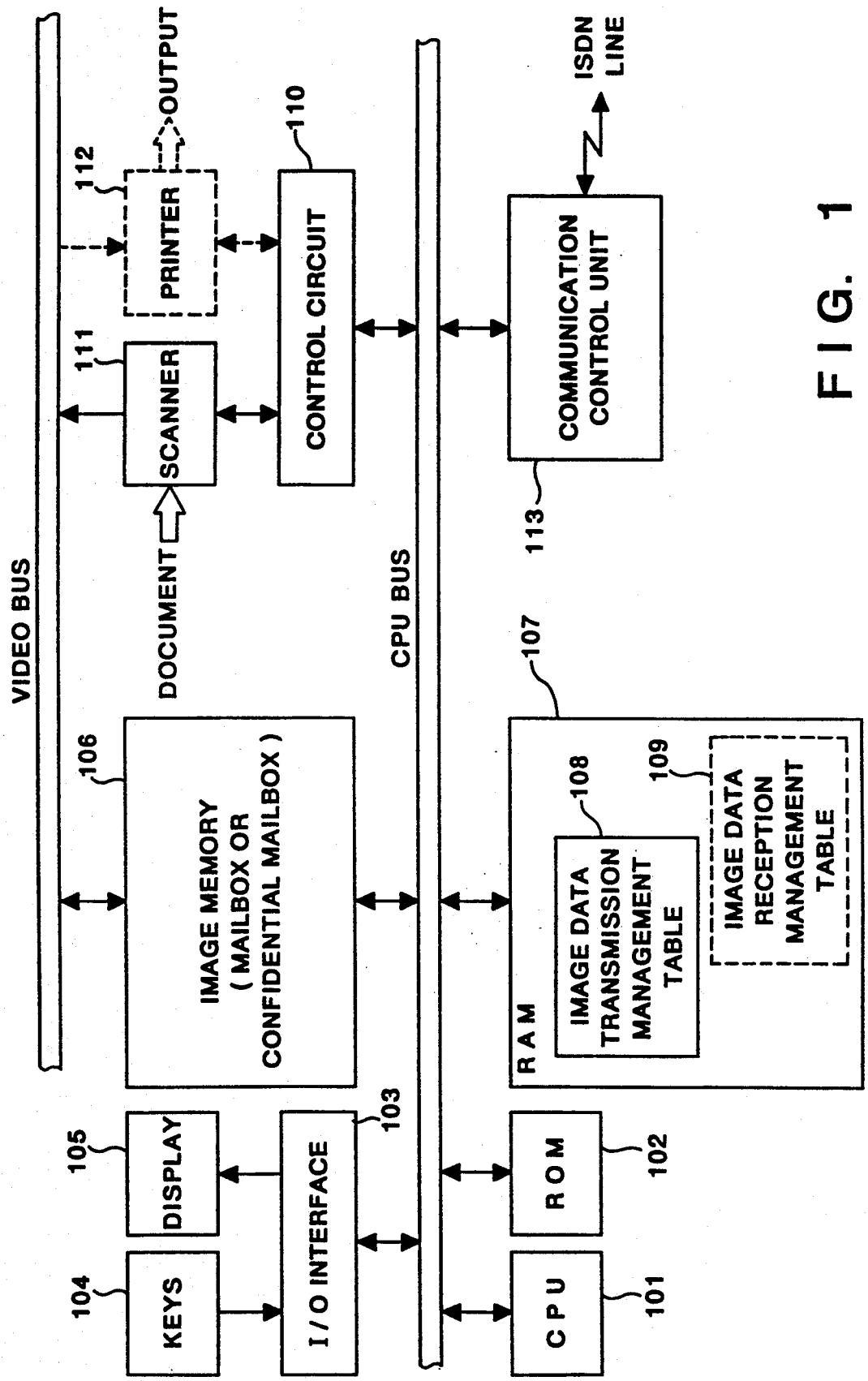
FIGS. 1 and 2 are block diagrams of a facsimile apparatus which is a preferred embodiment of the present invention.

FIG. 1 is a block diagram of a facsimile apparatus which is a preferred embodiment of the present invention. The facsimile apparatus of FIG. 1 is illustrative of a case in which the apparatus functions as an apparatus on a transmitting side. The apparatus of FIG. 1 includes a CPU 101 for executing main control of the facsimile apparatus, a ROM 102 storing a communication control program, which is shown in FIG. 5, FIG. 8, FIG. 11 or FIG. 14, executed by the CPU 101 for the apparatus on the transmitting side, an i/o interface 103, a key group 104 provided on a console (not shown), a display device (LCD) provided on the same console, an image memory (used as a mailbox or confidential mailbox) 106 for storing image data, a RAM 107 which the CPU 101 uses as a working area, an image data transmission management table 108 provided in the RAM 107, an image data reception management table 109 provided in the RAM 107, a control circuit 110 for controlling an input/output unit, a scanner 111 for reading a document image, a printer 112 for outputting image data from the image memory 106 (used as a mailbox or confidential mailbox), and a communication control unit 113 for communicating with an ISDN. It should be noted that the components indicated by the dashed lines in FIG. 1 are unnecessary when the facsimile apparatus functions solely as the apparatus on the transmitting side.

Figure 2:
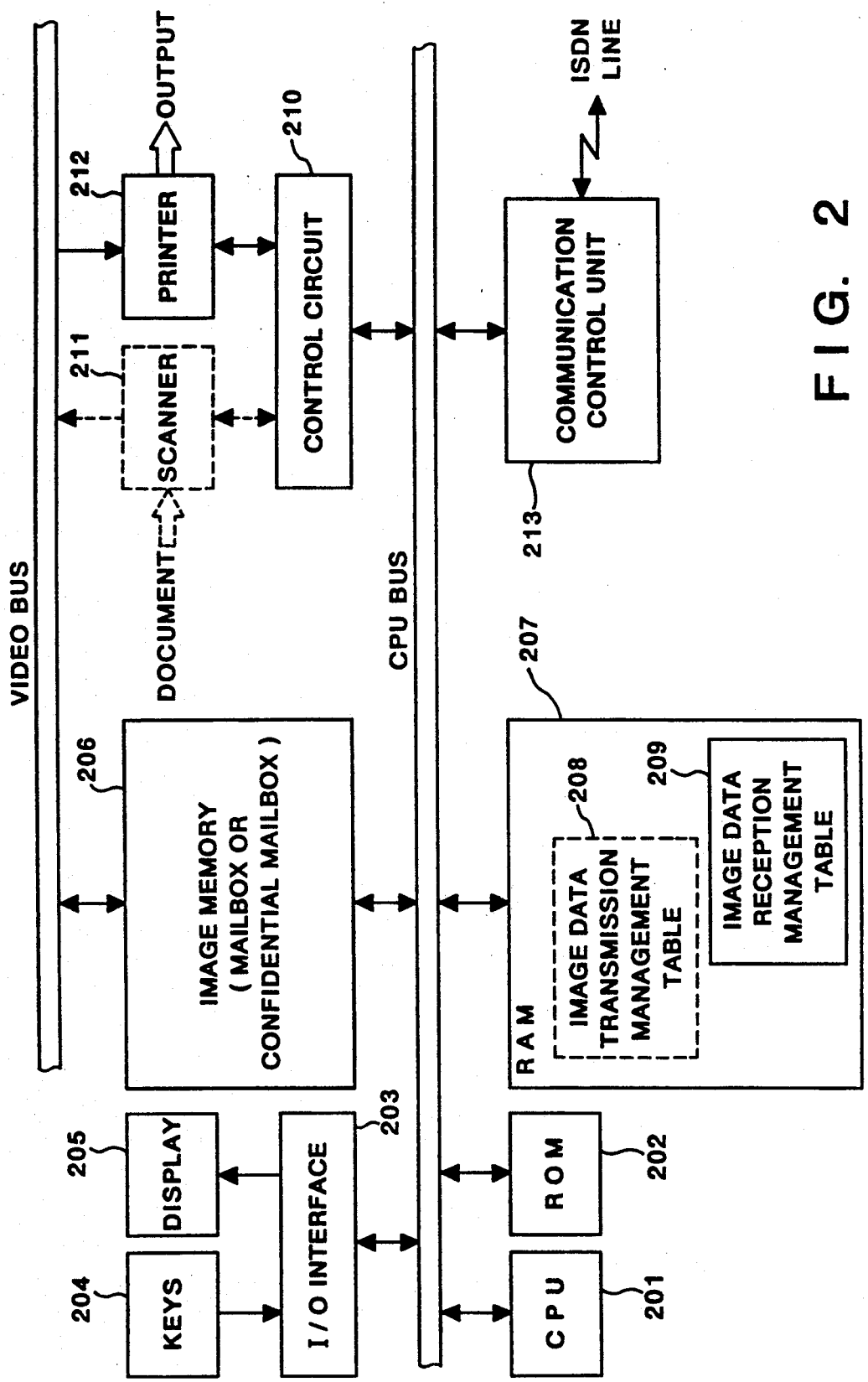

FIG. 2 is a block diagram of a facsimile apparatus which is a preferred embodiment of the present invention. The facsimile apparatus of FIG. 2 is illustrative of a case in which the apparatus functions as an apparatus on a receiving side, and the major portion thereof is the same as in FIG. 1. However, a ROM 202 stores a communication control program, which is shown in FIG. 6, FIG. 9, FIG. 12 or FIG. 15, executed by a CPU 201 for the apparatus on the receiving side. The components indicated by the dashed lines in FIG. 2 are unnecessary when the facsimile apparatus functions solely as the apparatus on the receiving side.

Figure 3:
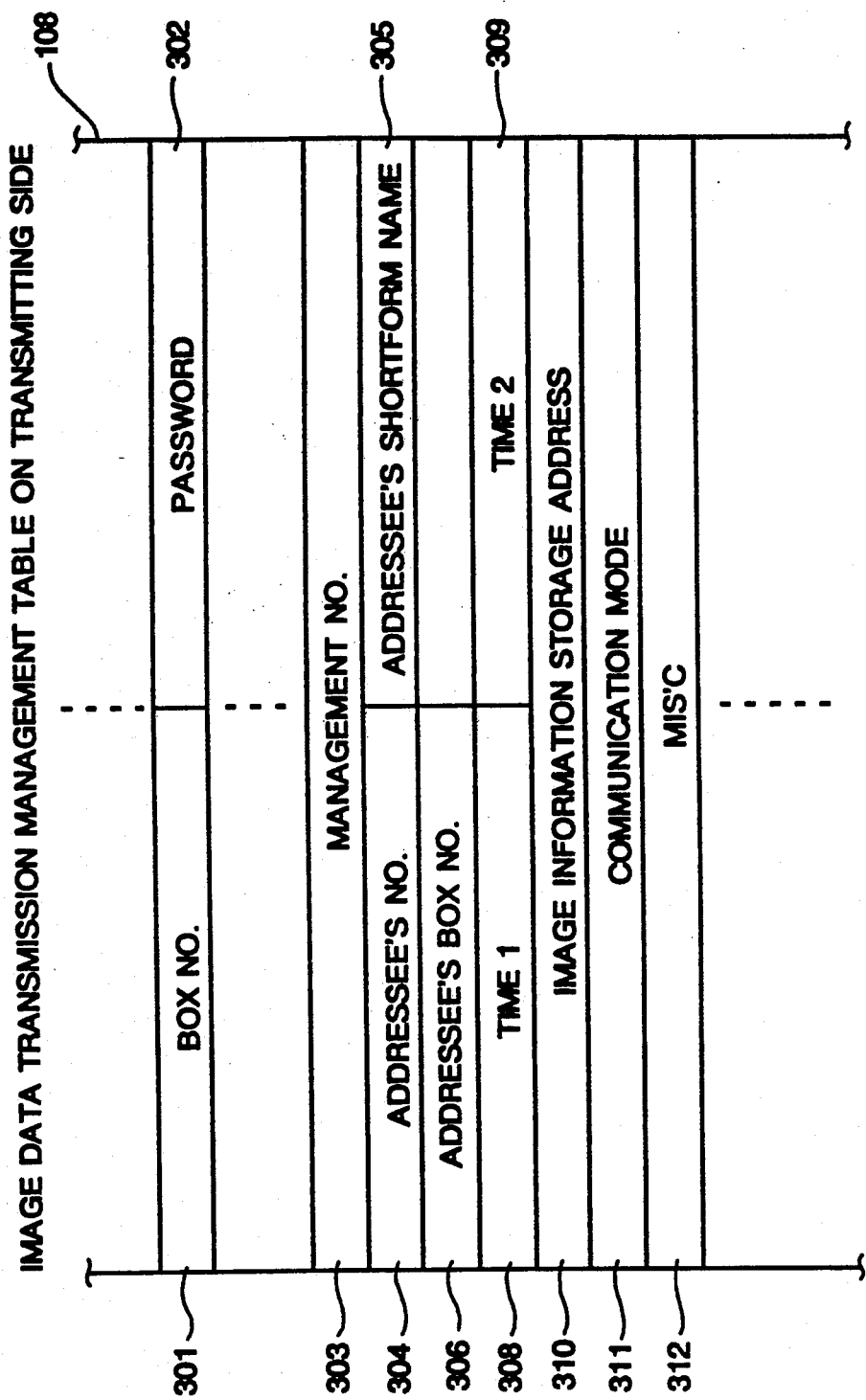
FIG. 3 is a diagram showing data stored in an image data transmission management table of the facsimile apparatus constituting the preferred embodiment of the invention.

FIG. 3 is a diagram showing data stored in the image data transmission management table 108 of the facsimile apparatus constituting the preferred embodiment of the invention, and FIG. 4 is a diagram showing data stored in the image data reception management table 209 of the facsimile apparatus constituting the preferred embodiment of the invention.

In FIG. 3, an addressor possesses a confidential mailbox number for his own use, as well as his own password. The addressor sets this confidential mailbox number in a box number section 301 and registers his own password in a password section 302 in advance.

In FIG. 4, an addressee possesses a mailbox number (or a confidential mailbox number) for his own use, as well as his own password. The addressee sets this mailbox number (or the confidential mailbox number) in a box number section 401 and, in a case where confidential information is received, registers his own password in a password section 402 in advance. It should be noted that the addressee notifies the addressor of the set box number (confidential mailbox number) beforehand. The other elements in the management tables will be made clear from the following description.

Four embodiments will now be described with regard to a facsimile apparatus in which the addressor is capable of confirming that mail has reached another party with certainty.

First Embodiment

The first embodiment relates to a case where an addressee, who has received notice of the fact that mail is to be received, informs the transmitting side of the fact that printing is actually taking place when image data are to be printed out. In this embodiment the image memory 106 shown in FIG. 1 is unnecessary when the facsimile apparatus functions solely as the apparatus on the transmitting side.

Figure 5:
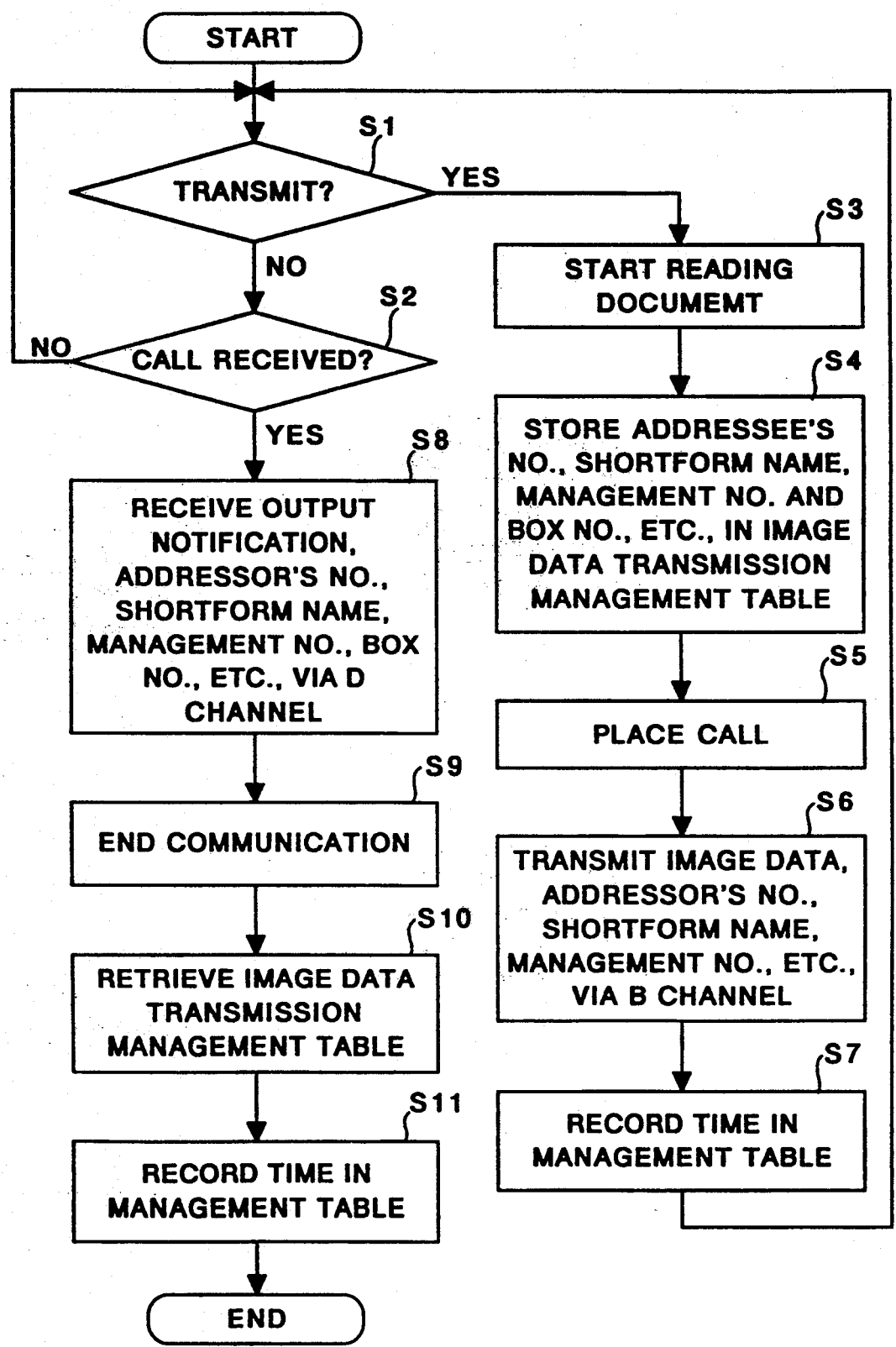
FIG. 5 is a flowchart showing a communication protocol of an apparatus on the transmitting side in a first embodiment.
Figure 6:
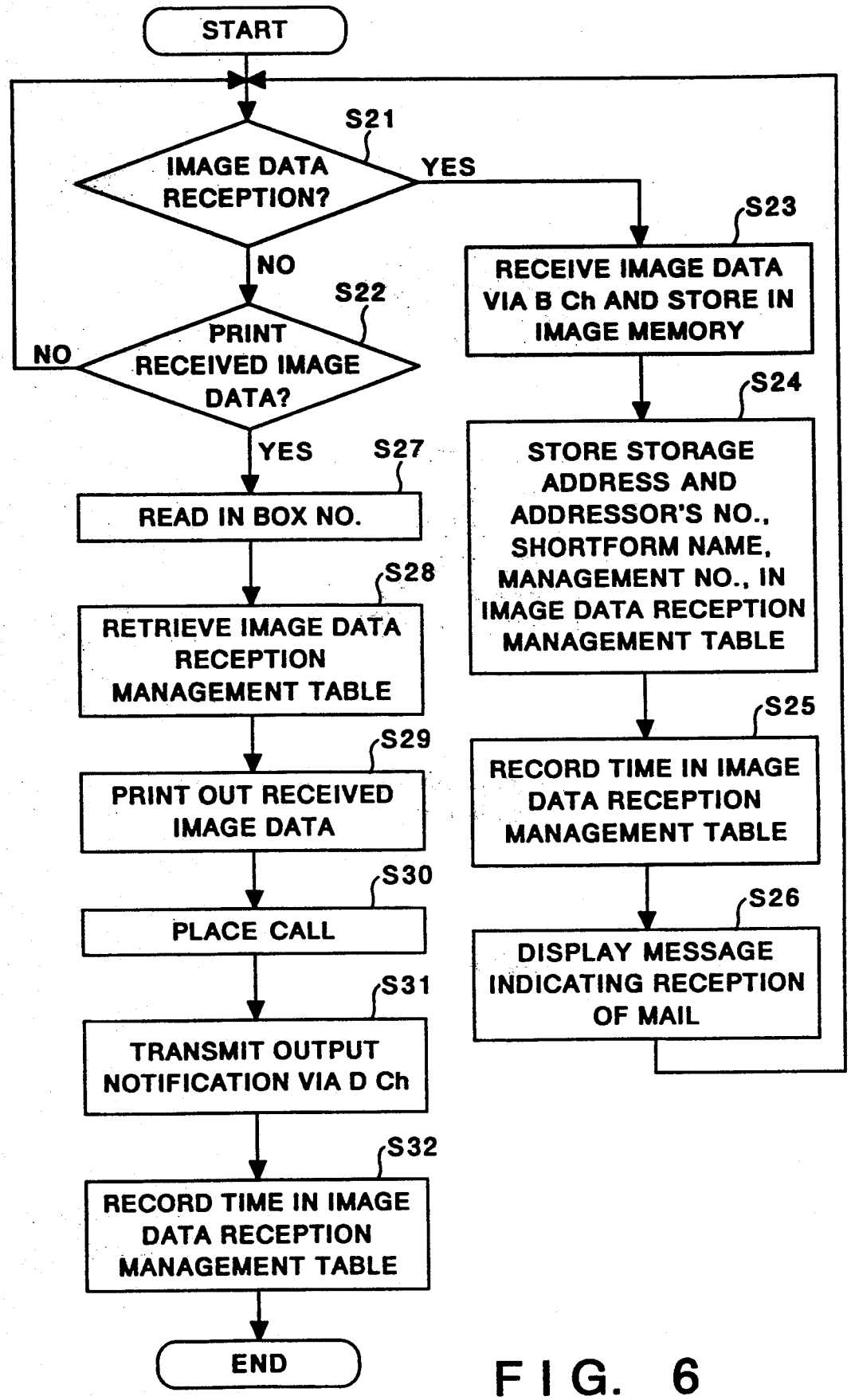
FIG. 6 is a flowchart showing a communication protocol of an apparatus on the receiving side in the first embodiment.
Figure 7:
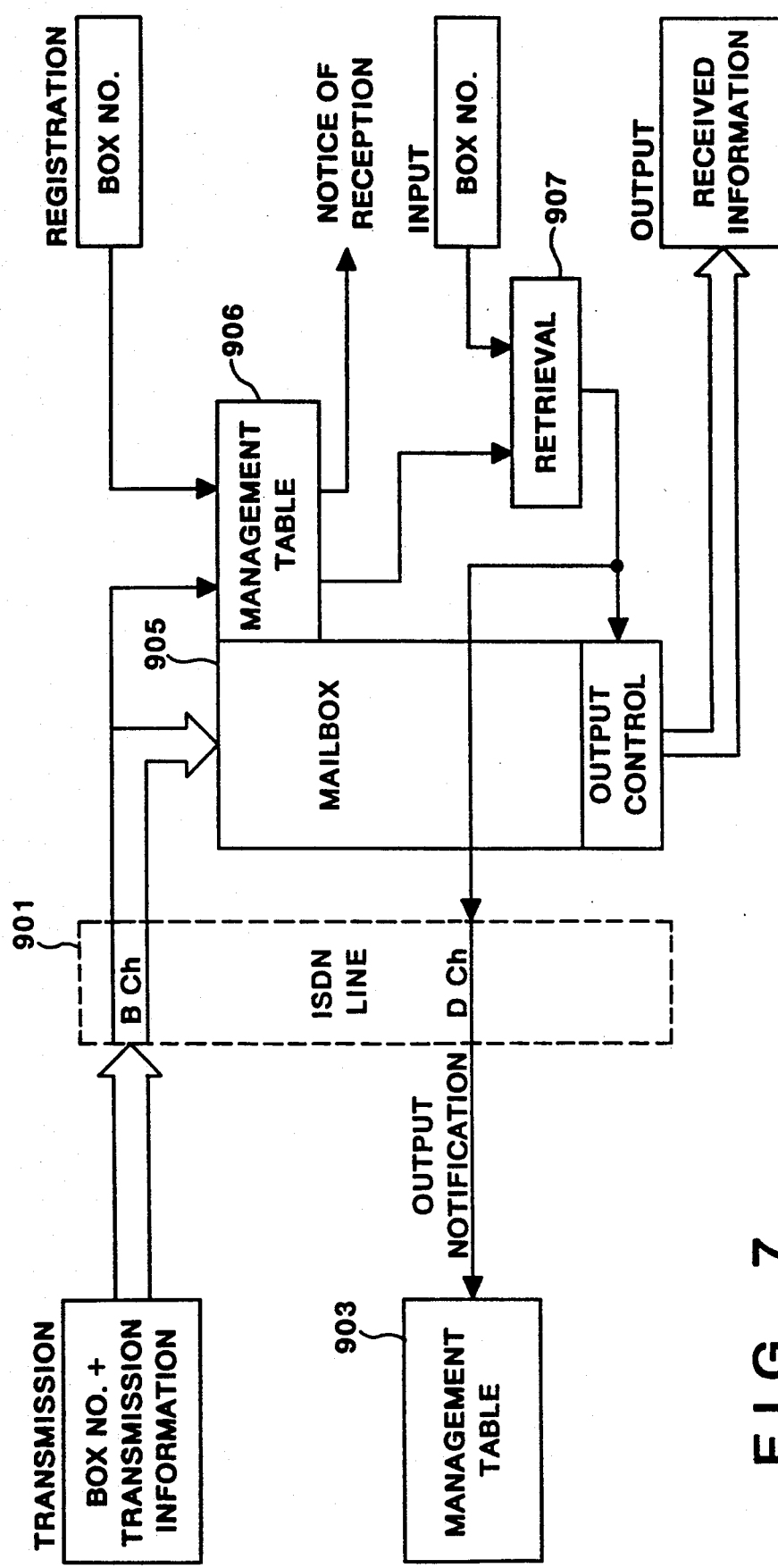
FIG. 7 is a conceptual diagram for describing the flow of information in the first embodiment.

FIG. 5 is a flowchart showing a communication protocol of the apparatus on the transmitting side in the first embodiment, FIG. 6 is a flowchart showing a communication protocol of the apparatus on the receiving side in the first embodiment, and FIG. 7 is a conceptual diagram for describing the flow of information in the first embodiment.

In FIG. 5 for the apparatus on the transmitting side, it is discerned at step S1 whether there is a request for transmission. If there is a request for transmission, the particular document is read at step S3 and the resulting image data are stored in the mailbox 106. At step S4, a management number is assigned to the stored image data and stored in a management number section 303, the addressee's number that is the destination of the image data is stored in an addressee's number section 304, and the addressee's shortform name is stored in an addressee's shortform section 305. In addition, the box number of the addressee known from the addressee is stored in an addressee's box number section 306. The addressee's number in the addressee's number section 304 is read out and called at step S5. Transmission of image data in accordance with a G4 protocol is performed using a B channel at step S6. At such time the addressor's number, the addressor's shortform name and the management number in the management number section 303, which serves as user information, are transmitted as additional transmission information to the apparatus on the receiving side. The time of the image data transmission is recorded in a Time 1 section 308 at step S7.

In FIG. 6 for the apparatus on the receiving side, whether the image data are to be received is acknowledged at step S21 when the apparatus is called from the apparatus on the transmitting side. If the image data are to be received, the image data are received via the B channel at step S23 in accordance with the G4 protocol. A management number, which is convenient for managing the received image data, is assigned to the data and stored in a management number section 403 at step S24. The other party's number, namely the number of the party (addressor) transmitting the image data, is stored in the other party's (addressor's) number section 404, the addressor's shortform name is stored in an addressor's shortform name section 405, the other party's box number is stored in an addressor's box number section 406, and the addressor's management number, which is management information on the transmitting side, is stored in an addressor's management number section 407. The time of the image data reception is stored in a Time 1 section 408 at step S25. Next, in accordance with the management information in the image data reception management table 209, the pertinent mailbox number and a message indicating reception of mail are displayed (or printed out) to notify the addressee.

Thereafter, it is discerned at step S22 whether there is request from the console for print-out of the received image. If there is a request for received-image print-out, the addressee enters his own box number at step S27 in order for the received-image data to be printed. The box number section 401 of the image data reception management table 209 is retrieved by the entered box number at step S28. When retrieval is obtained, the pertinent received-image data are printed at step S29. The addressor's number in the addressor's number section 404 is read out and the apparatus on the transmitting side is called at step S30. The fact of actual print-out of the received-image data is communicated, via a D channel, to the apparatus on the transmitting side as notification of output. At such time the apparatus on the transmitting side is also informed of the addressor's number, the addressor's shortform name, the box number in box number section 401, the box number in the addressor's box number section 406, and the management number in the addressor's management number section 407. When this transmission ends, the time of notification is recorded in a Time 2 section 409.

In response to the call made at step S30, arrival of the call is acknowledged at step S2 in the apparatus on the transmitting side (FIG. 5). The flow proceeds to step S8, at which notification of actual printing, the addressor's number, the addressor's shortform name, the box number in box number section 401 and the management number in the addressor's management number section 407, which are sent from the apparatus on the receiving side via the D channel, are received. The system waits for the end of transmission at step S9. Next, at step S10, the management number in the management number section 303, the addressee's number in the addressee's number section 304, and the box number in the addressee's box number section 306 are retrieved by the received data. When retrieval is obtained, the time of reception of notification of actual print-out is recorded in a Time 2 section 309 at step S11.

As a result of the foregoing, the addressor is capable of collectively confirming the circumstances of the mail transmission and whether or not print-out has actually taken place by printing out or displaying the list constituting the management table 309.

Second Embodiment

The second embodiment relates to a case where an addressee, who has received notification to the effect that a confidential mail transmission is to be made, requests print-out permission from the transmitting side when the image data are to be printed out. In this embodiment the image memory 106 shown in FIG. 1 is unnecessary when the facsimile apparatus functions solely as the apparatus on the transmitting side.

Figure 8:
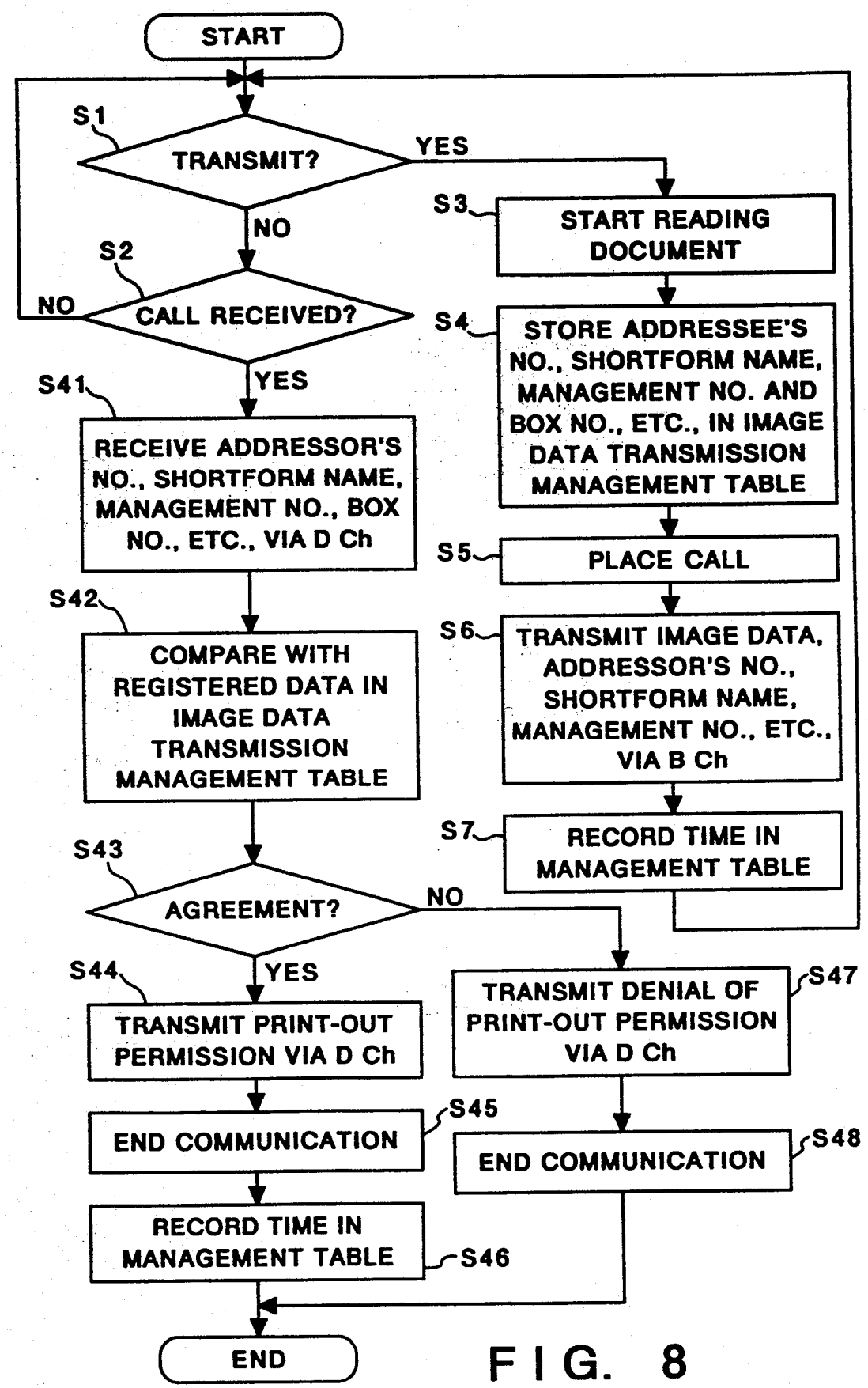
FIG. 8 is a flowchart showing a communication protocol of an apparatus on the transmitting side in a second embodiment.
Figure 9A:
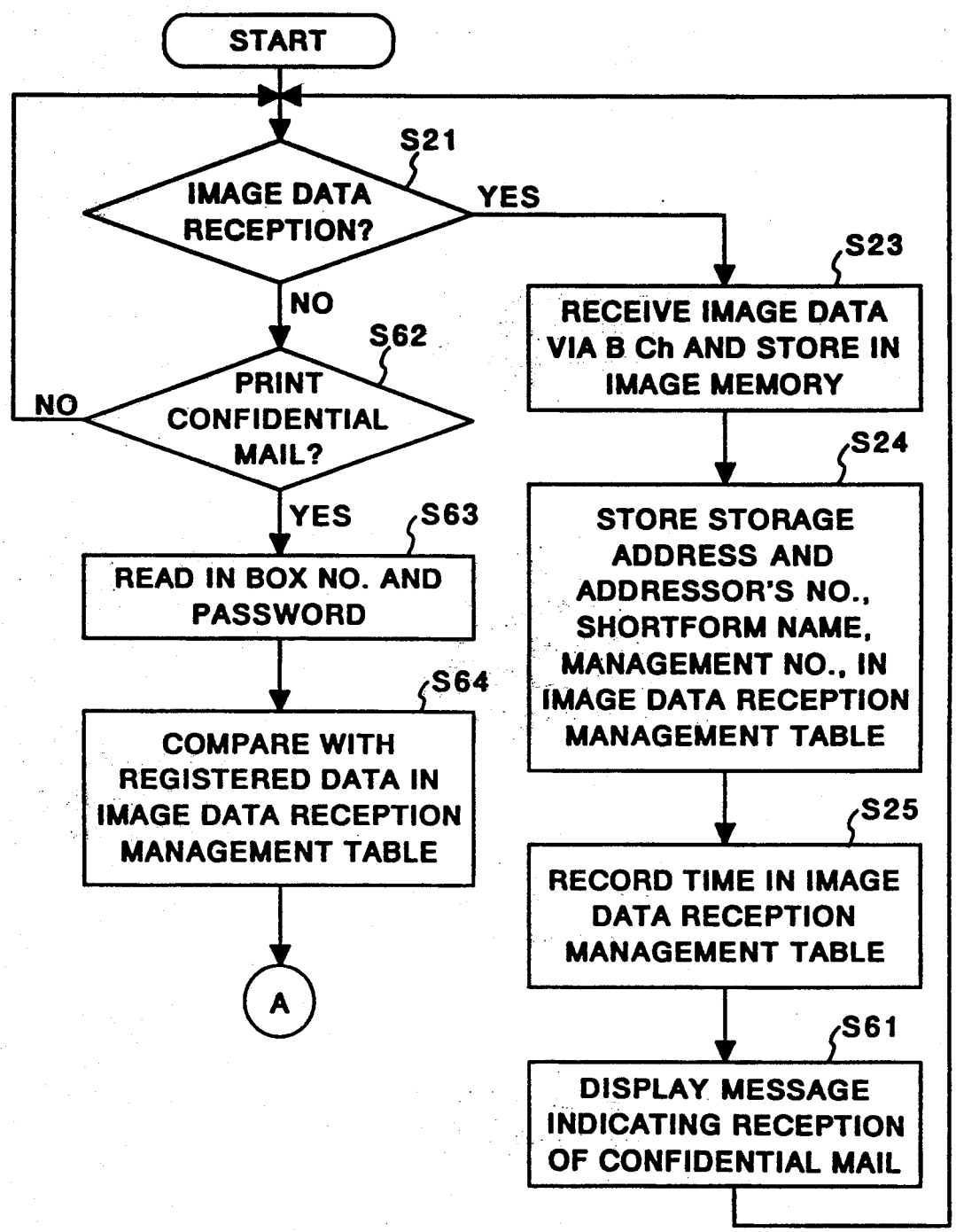
FIGS. 9A and 9B are flowcharts showing a communication protocol of an apparatus on the receiving side in the second embodiment.
Figure 9B:
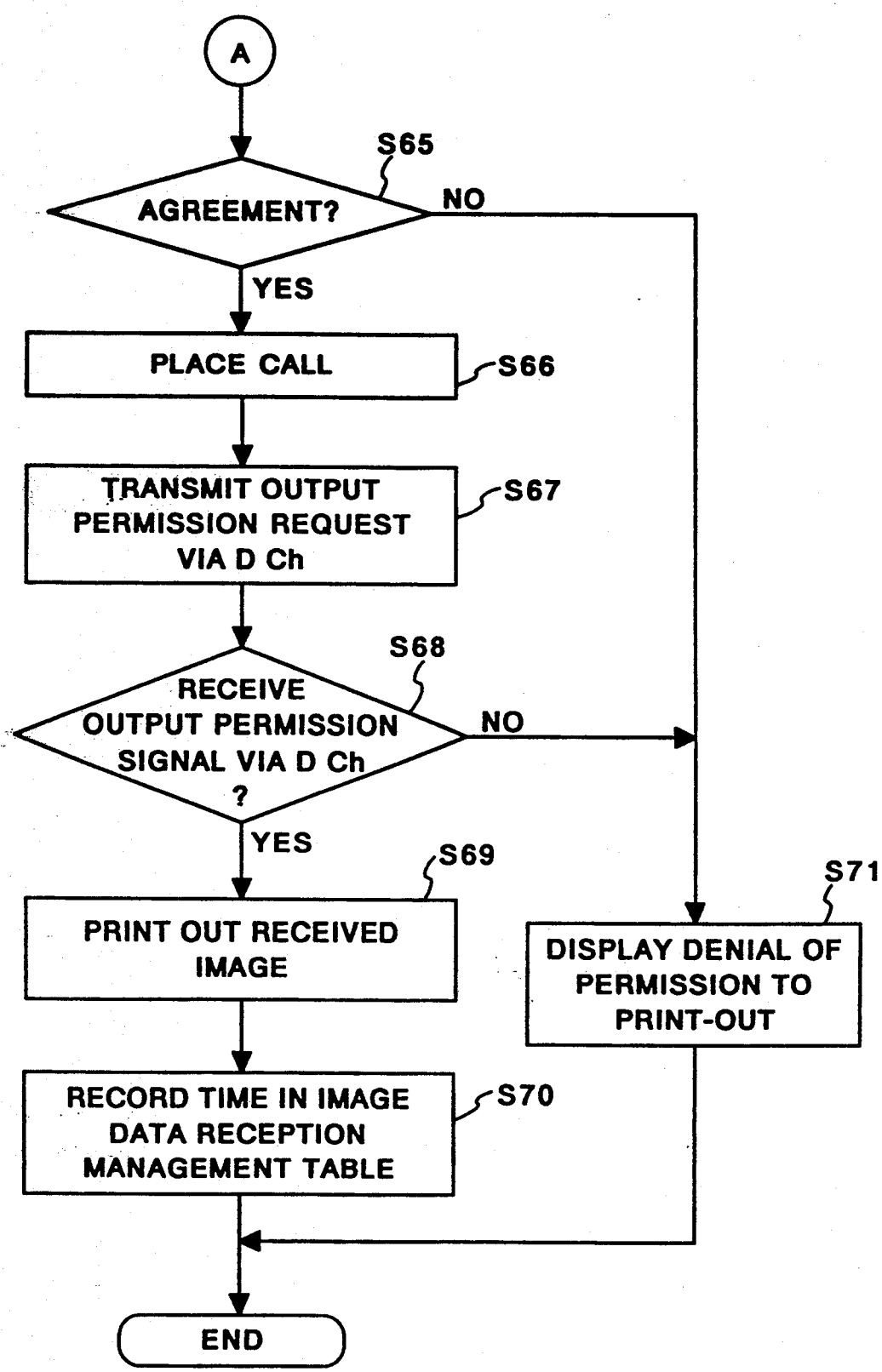
Figure 10:
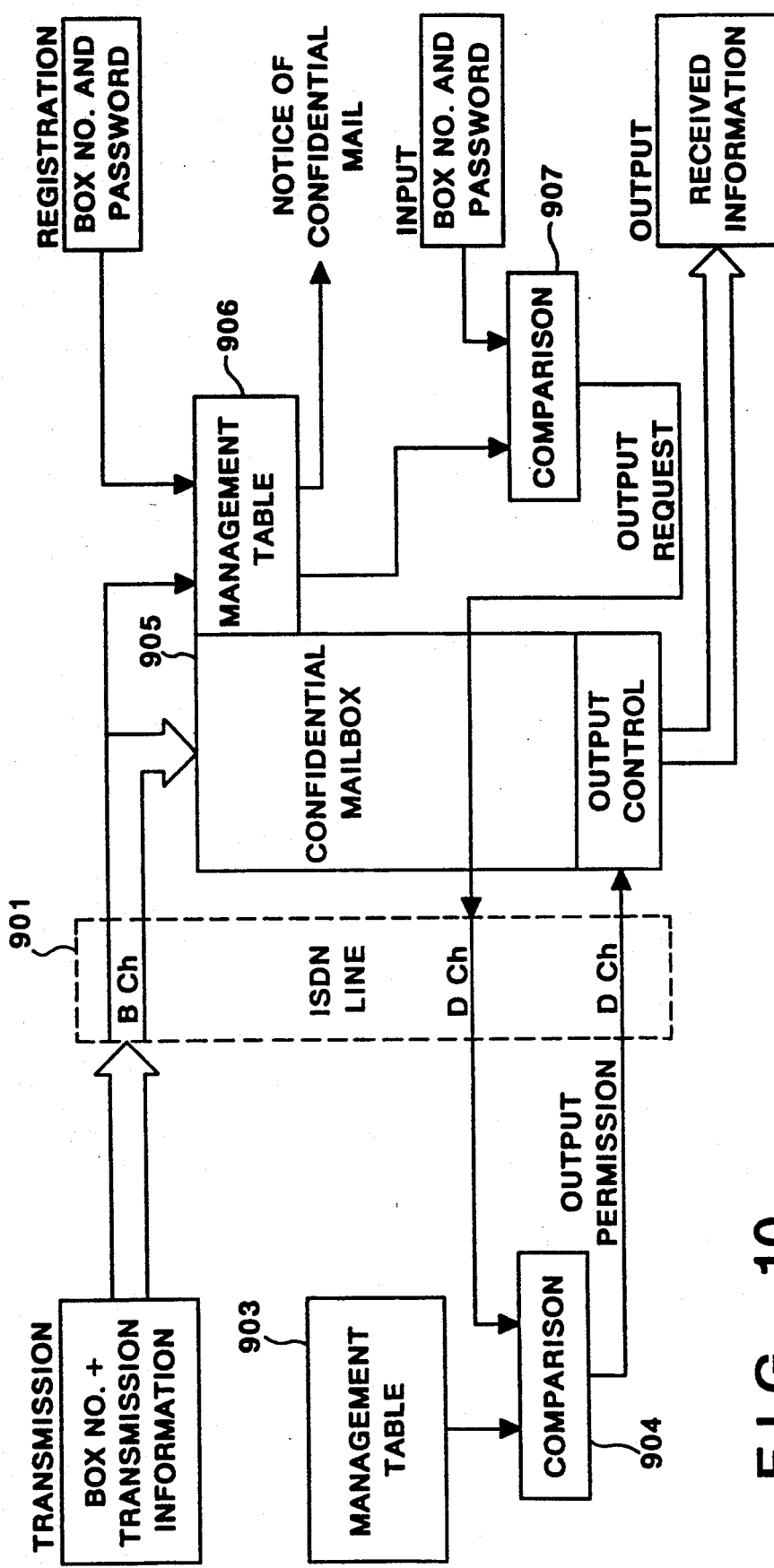
FIG. 10 is a conceptual diagram for describing the flow of information in the second embodiment.

FIG. 8 is a flowchart showing the communication protocol of the apparatus on the transmitting side according to the second embodiment, FIG. 9 is a flowchart showing the communication protocol of the apparatus on the receiving side according to the second embodiment, and FIG. 10 is a conceptual view for describing the flow of information in the second embodiment. It should be noted that steps identical with those of the first embodiment are designated by like reference characters and are not described again. In the second embodiment, moreover, the image memories 106, 206 illustrated in FIGS. 1 and 2 are used as confidential mailboxes.

In FIG. 9 for the apparatus on the receiving side, the pertinent confidential mailbox number and a message regarding confidential mail reception are displayed (or printed) at step S61 in accordance with the image data reception management table 209 to notify the addressee.

Thereafter, it is discerned at step S62 whether there is a confidential mail print request from the console. If there is a request for printing of confidential mail, the addressee enters his own confidential mailbox number and password at step S63 in order for the confidential image data to be printed out. Next, at step S64, these inputs are compared with respective ones of the box number in box number section 401 and password in password section 402 of the image data reception management table 209. It is distinguished at step S65 whether the compared box numbers and passwords agree. If there is non-agreement, a display indicating that print-out is not allowed is presented immediately at step S71. If agreement is found, the addressor's number is read out of the addressor's number section 404 and the apparatus on the transmitting side is called at step S66. A print permission request for printing out the confidential image data is transmitted via the D channel at step S67. At this time the apparatus on the transmitting side is informed also of the addressor's number, the addressor's shortform name, the box number in box number section 401 and the management number in the addressor's management number section 407. A print permission signal is received via the D channel at step S68. If the print permission signal is allowed, the confidential image data are printed at step S69. If the print permission signal is not allowed, however, the program proceeds to step S71 and the display indicating that print-out is forbidden is immediately presented. When printing ends, the print-out time is recorded in the Time 2 section 409 at step S70.

In response to the call made at step S66, arrival of the call is acknowledged at step S2 in the apparatus on the transmitting side (FIG. 8). The flow proceeds to step S41, at which the print permission request, the addressor's number, the addressor's shortform name, the box number in box number section 401 and the management number in the addressor's management number section 407, which are sent from the apparatus on the receiving side via the D channel, are received. These received data are compared with respective ones of the management number in the management number section 303, the addressee's number in the addressee's number section 304 and the box number in the addressee's box number section 306. Whether agreement is obtained is distinguished at step S43. In case of non-agreement, the program proceeds to step S47, at which denial of print-out permission is transmitted at step S43. The system waits for the transmission to end at step S48. In case of agreement, the program proceeds to step S44, at which print-out permission is transmitted via the D channel. The system waits for communication to end at step S45. The time at which notification of permission to print was transmitted is recorded in the Time 2 section 309 at step S46.

As a result of the foregoing, the addressor is capable of collectively confirming the circumstances of confidential mail transmission and whether or not printing has actually taken place by printing out or displaying the list constituting the management table 108.

In the foregoing embodiment, the apparatus on the transmitting side is informed of the fact of actual print-out of the received image data in the apparatus on the receiving side, or permission to print-out is requested. However, the invention is not limited solely to printing of the data. Even when data are outputted to another medium (e.g., a floppy disc for an image), this can be considered likewise as a received image arriving at the addressee's location, and therefore it is possible to utilize the present invention in the same manner.

In the foregoing embodiments, comparison is made based on a specific password. However, it is possible for the comparison to be given a free pass by using another password, such as a password registered by a space.

Further, though there is an apparatus on the receiving side according to the foregoing embodiments, broadcasting in which there are a plurality of apparatus on the receiving side is possible to perform in a similar manner.

Third Embodiment

The third embodiment relates to a case where an addressee, who has received advance notice of a confidential mail transmission, requests a confidential mail transmission of the image data by a manual operation at any desired time. In this embodiment the image memory 206 shown in FIG. 2 is unnecessary when the facsimile apparatus functions solely as the apparatus on the receiving side.

Figure 11A:
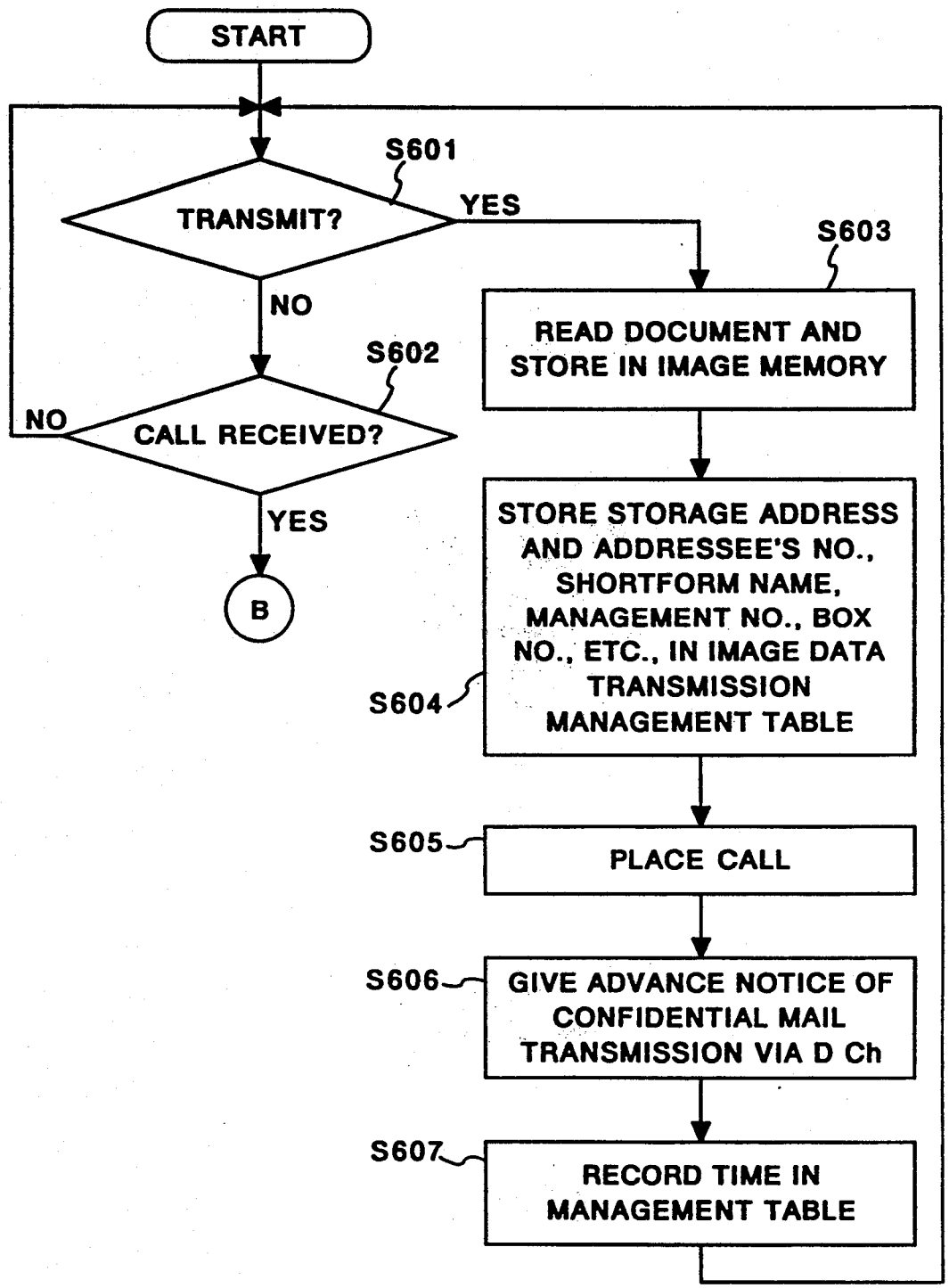
FIGS. 11A add 11B are flowcharts showing a communication protocol of an apparatus on the transmitting side in a third embodiment.
Figure 11B:
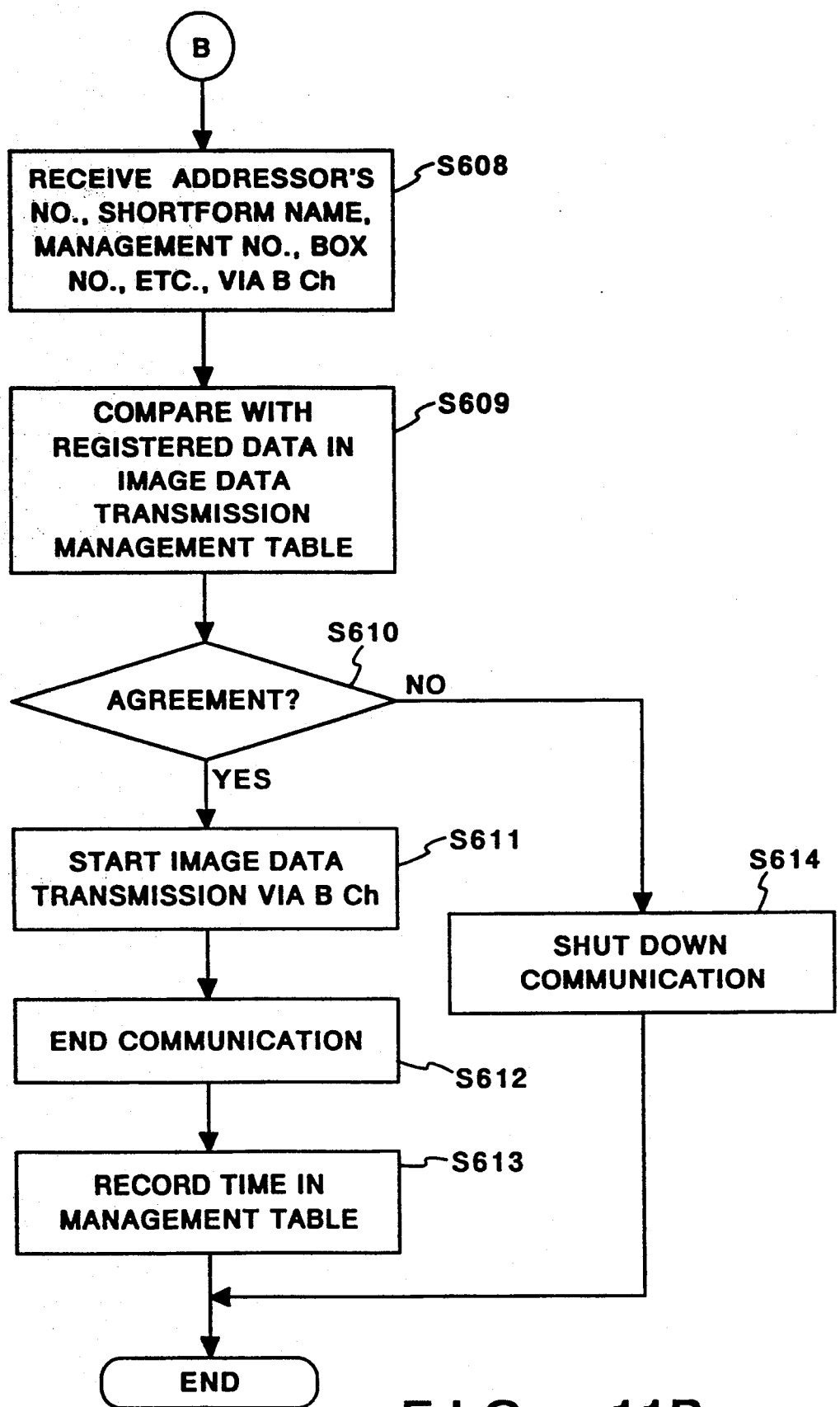
Figure 12A:
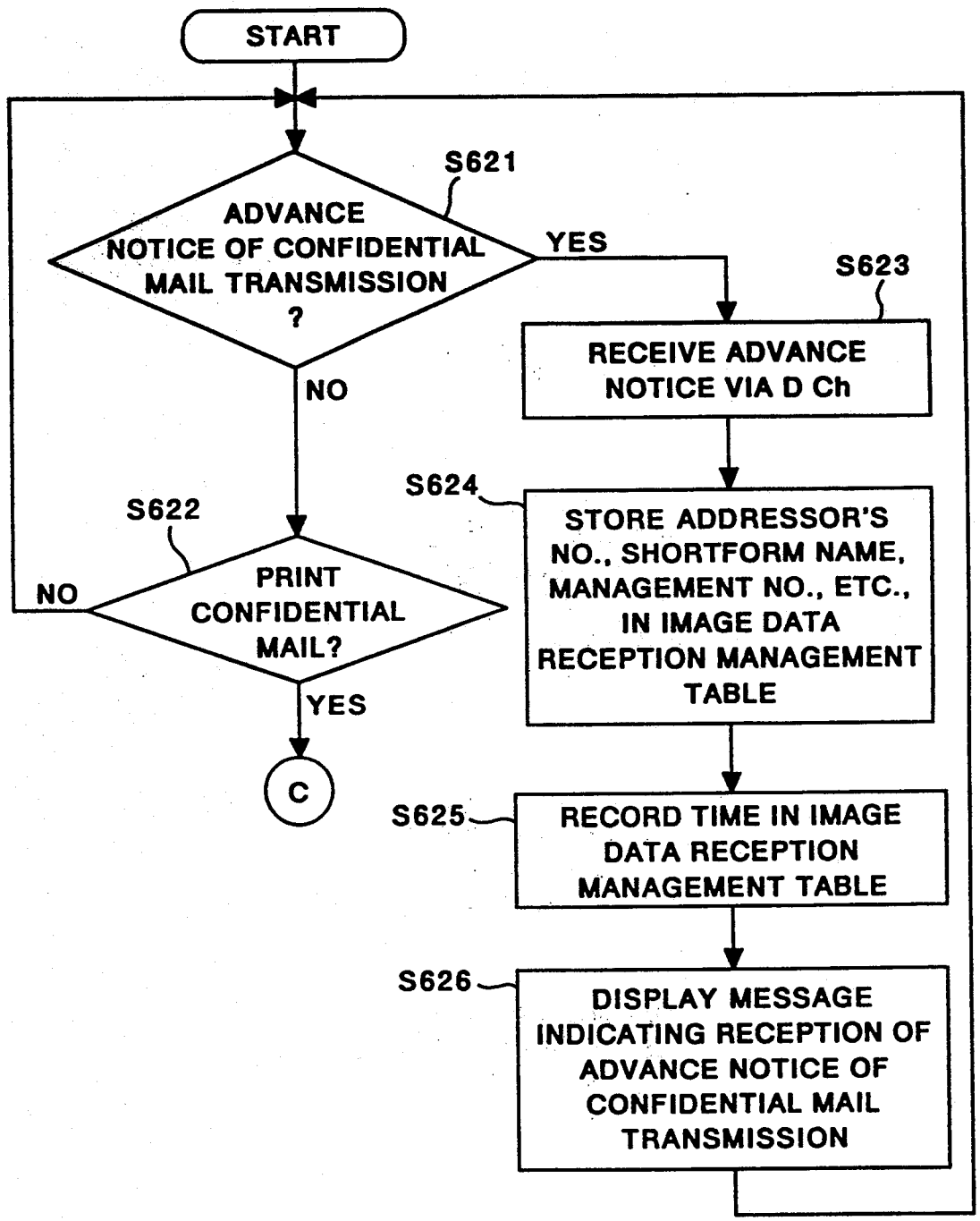
FIGS. 12A and 12B are flowcharts showing a communication protocol of an apparatus on the receiving side in the third embodiment.
Figure 12B:
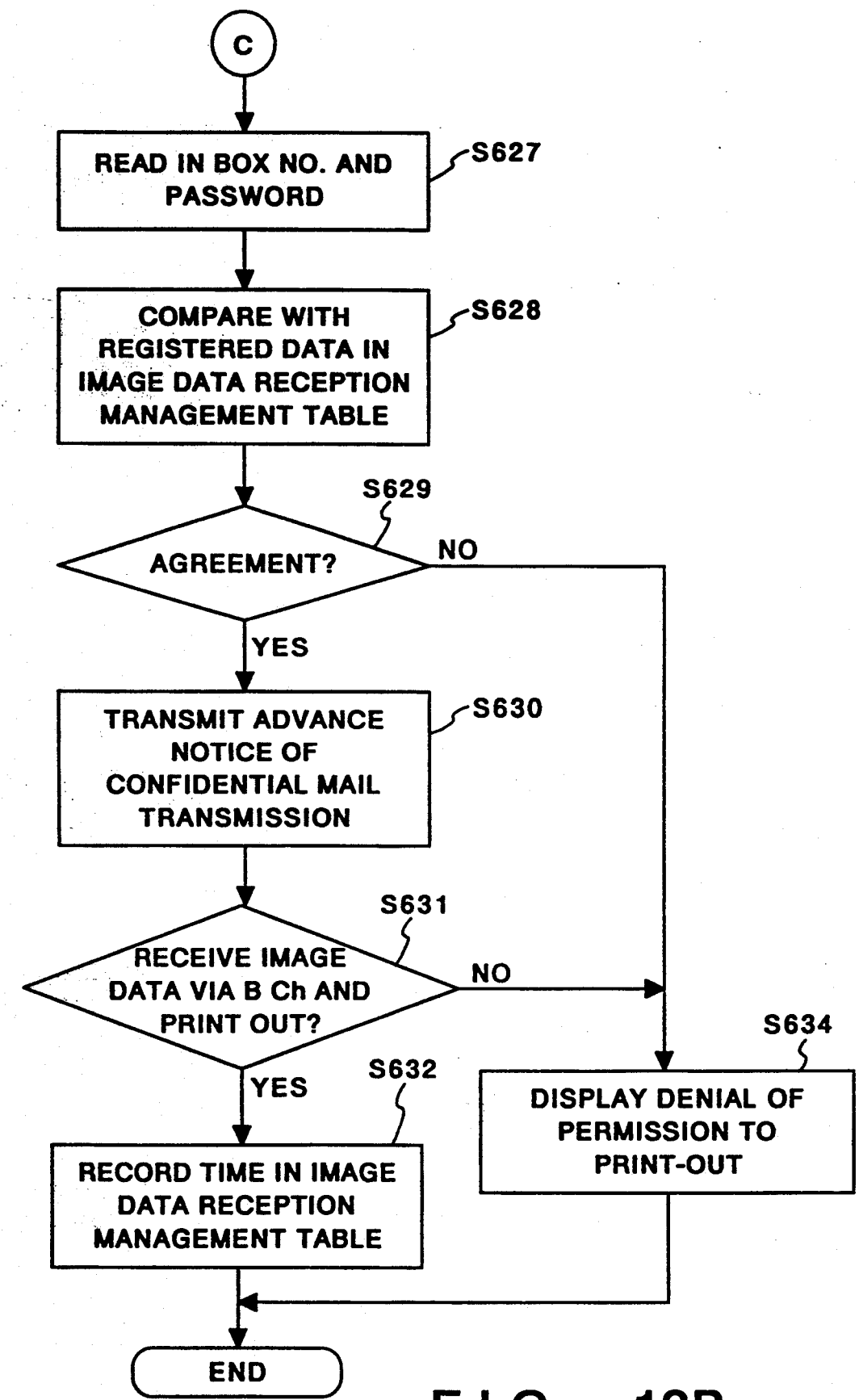
Figure 13:
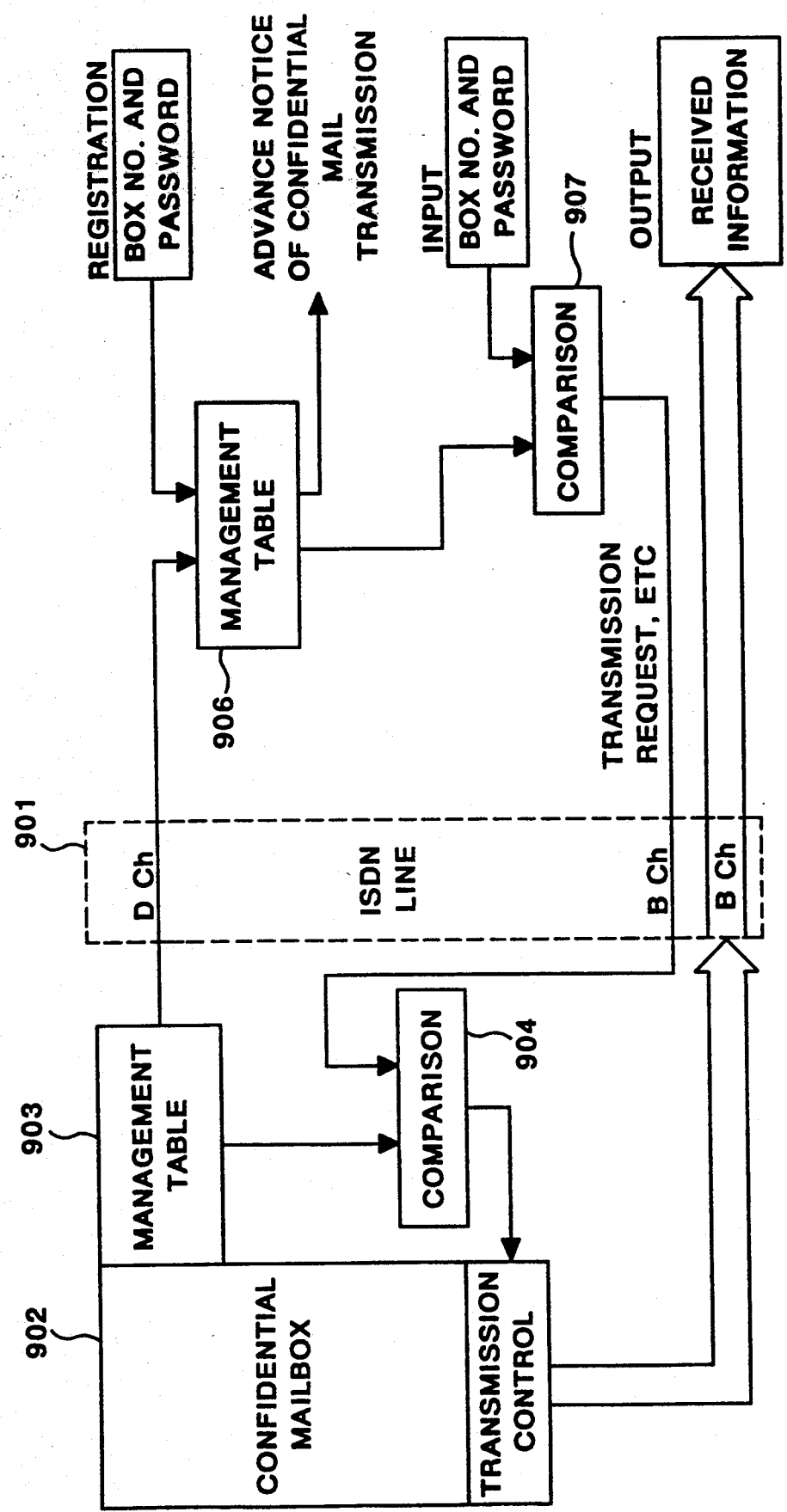
FIG. 13 is a conceptual diagram for describing the flow of information in the third embodiment.

FIG. 11 is a is a flowchart showing a communication protocol of an apparatus on the transmitting side in the third embodiment, FIG. 12 is a flowchart showing a communication protocol of an apparatus on the receiving side in the third embodiment, and FIG. 13 is a conceptual diagram for describing the flow of information in the third embodiment.

In FIG. 11 for the apparatus on the transmitting side, it is discerned at step S601 whether there is a request for transmission. If there is a request for transmission, the document is read at step S603 and the resulting image data are stored in the image memory 106. At step S604, a management number is assigned to the stored image data and stored in the management number section 303, the address at which these data are stored in stored in an image information storage address section 310, the addressee's number that is the destination of the image data is stored in the addressee's number section 304, and the addressee's shortform name is stored in the addressee's shortform section 305. In addition, the box number of the addressee known from the addressee is stored in an addressee's box number section 306. The addressee's number in the addressee's number section 304 is read and called at step S605. Advance notice to the effect that a confidential mail transmission is ready is given via the D channel at step S606. At such time the addressor's number, the addressor's shortform name and the management number in the management number section 303 are transmitted as advance notice of confidential mail transmission. The time at which advance notice of the confidential mail transmission is given is recorded in the Time 1 section 308 at step S607.

In FIG. 12 for the apparatus on the receiving side, whether there is advance notice of a confidential mail transmission is discerned at step S621 when the apparatus is called. If there is advance notice of the confidential mail transmission, the advance notice is received via the D channel at step S623. A management number, which is convenient for managing the image data planned to be received, is assigned and stored in the management number section 403 at step S624. The addressor's number, namely the number of the party (addressor) transmitting the image data, is stored in the addressor's number section 404, the addressor's shortform name is stored in the addressor's shortform name section 405, the addressor's box number, which is management information on the transmitting side, is stored in the addressor's box number section 406, and the addressor's management number, which likewise is management information on the transmitting side, is stored in an addressor's management number section 407. The time at which the advance notice of confidential mail transmission was received is stored in the Time 1 section 408 at step S625. Next, in accordance with the management information in the image data reception management table 209, the confidential mailbox number and a message indicating advance notice of confidential mail transmission are displayed to notify the addressee at step S626.

Further, it is discerned at step S622 whether there is a request from the console for print-out of the confidential mail. If there is a request for confidential mail print-out, the addressee enters his own box number and password at step S627 in order for the confidential image data to be received. These inputs are compared with respective ones of the registered box number in the box number section 401 and the registered password in the password section 402 at step S628. Whether the compared data agree is distinguished at step S629. In case of agreement, the program proceeds to step S630 since the request is a print request from the addressee himself. At this step the addressor's number in the addressor's number section 404 is read out, the apparatus on the transmitting side is called, and a confidential mail transmission is requested in accordance with the G4 protocol via the B channel. At such time the apparatus on the transmitting side is also informed, as the request for confidential mail transmission, of the addressor's number, the addressor's shortform name, the box number in box number section 401, the box number in the addressor's box number section 406, and the management number in the addressor's management number section 407. The image data are received via the B channel at step S631, and these data are printed out by the printer 212. However, if shutdown of the communication is discriminated, the program proceeds to step S634 and a display is immediately presented to the effect that print-out is not permitted. Next, at step S632, the communication mode used at the time of the image data communication is recorded in a communication mode section 411 and the time of the image communication is recorded in the Time 2 section 409. If the result of the comparison at step S629 is non-agreement, the program proceeds to step S634 and the display presented to the effect that print-out is not permitted.

In response to the call made at step S630, arrival of the call is acknowledged at step S602 in the apparatus on the transmitting side (FIG. 11). The flow proceeds to step S608, at which the addressor's number, the addressor's shortform name, the box number in box number section 401, the box number in the addressor's box number section 406 and the management number in the addressor's management number section 407, which are sent from the apparatus on the receiving side as the confidential mail transmission request via the B channel, are received. The received information is compared with respective ones of the box number in the box number section 301, the management number in the management number section 303, and the box number in the addressee's box number section 306. Whether agreement is obtained is distinguished at step S610. In case of agreement, the program proceeds to step S611, at which transmission of the image data stored in the box number section 301 is started via the B channel. Transmission is completed at step S612. The communication mode used at the time of communication of the image data is stored in a communication mode section 311 at step S613, and the time of the communication is stored in the Time 2 section 309. When the result of the comparison at step S610 is non-agreement, the program proceeds to step S614 and the communication is shut down.

It should be noted that the addressor is capable of confirming the circumstances of the confidential image data transmission by printing out or displaying the list constituting the management table 108. In particular, when confidential broadcasting is performed, an advantage of the invention is that the circumstances of transmission to a plurality of addressees can be confirmed at a glance by means of a list or the like.

Fourth Embodiment

The fourth embodiment relates to a case where the function of the third embodiment is supplemented with a function in which it is possible to select, depending upon the space remaining in the image memory of the apparatus on the receiving side, transmission of both advance notice of confidential mail transmission and image data or transmission of solely the advance notice of confidential mail transmission.

Figure 14B:
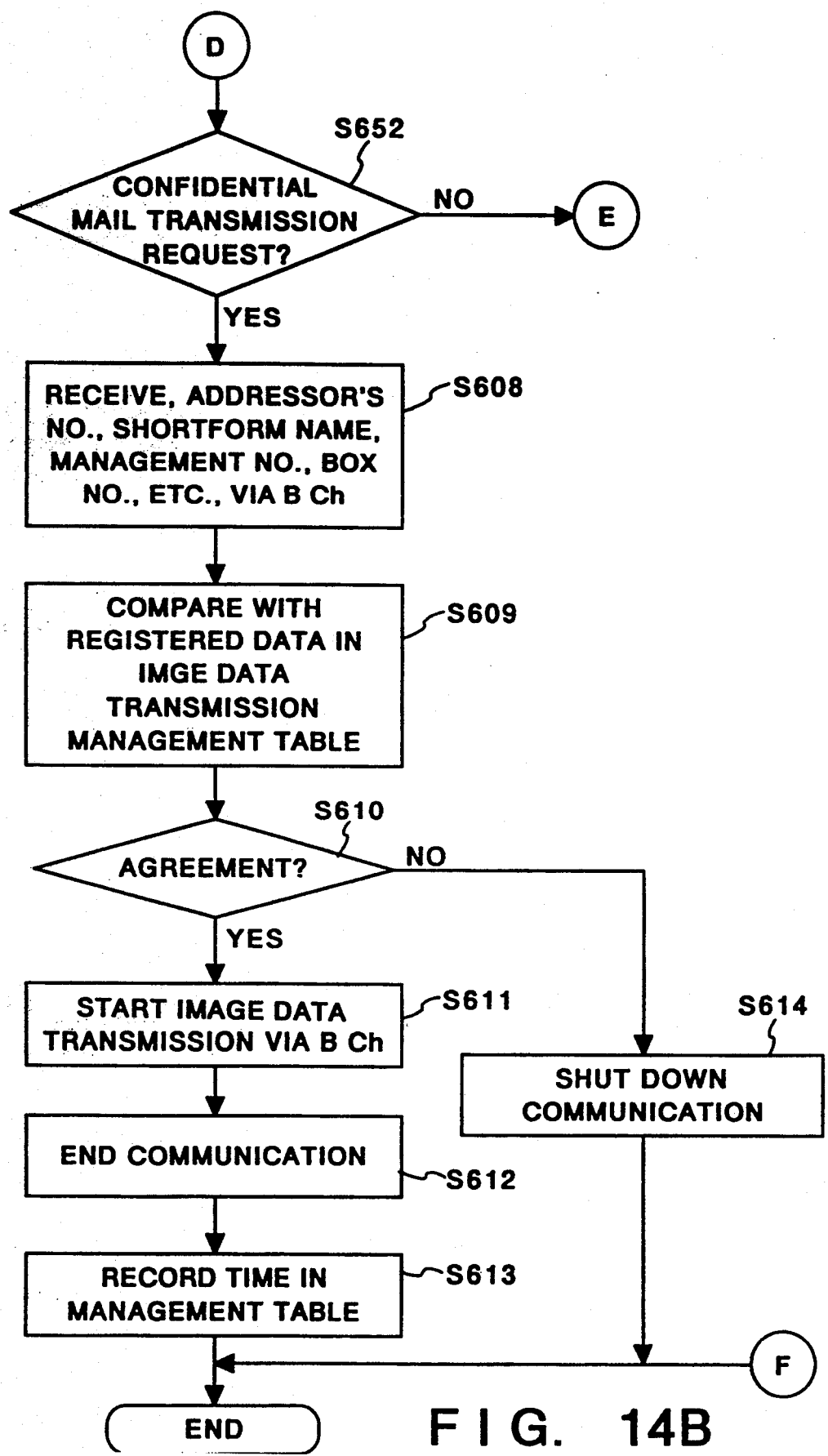
Figure 14C:
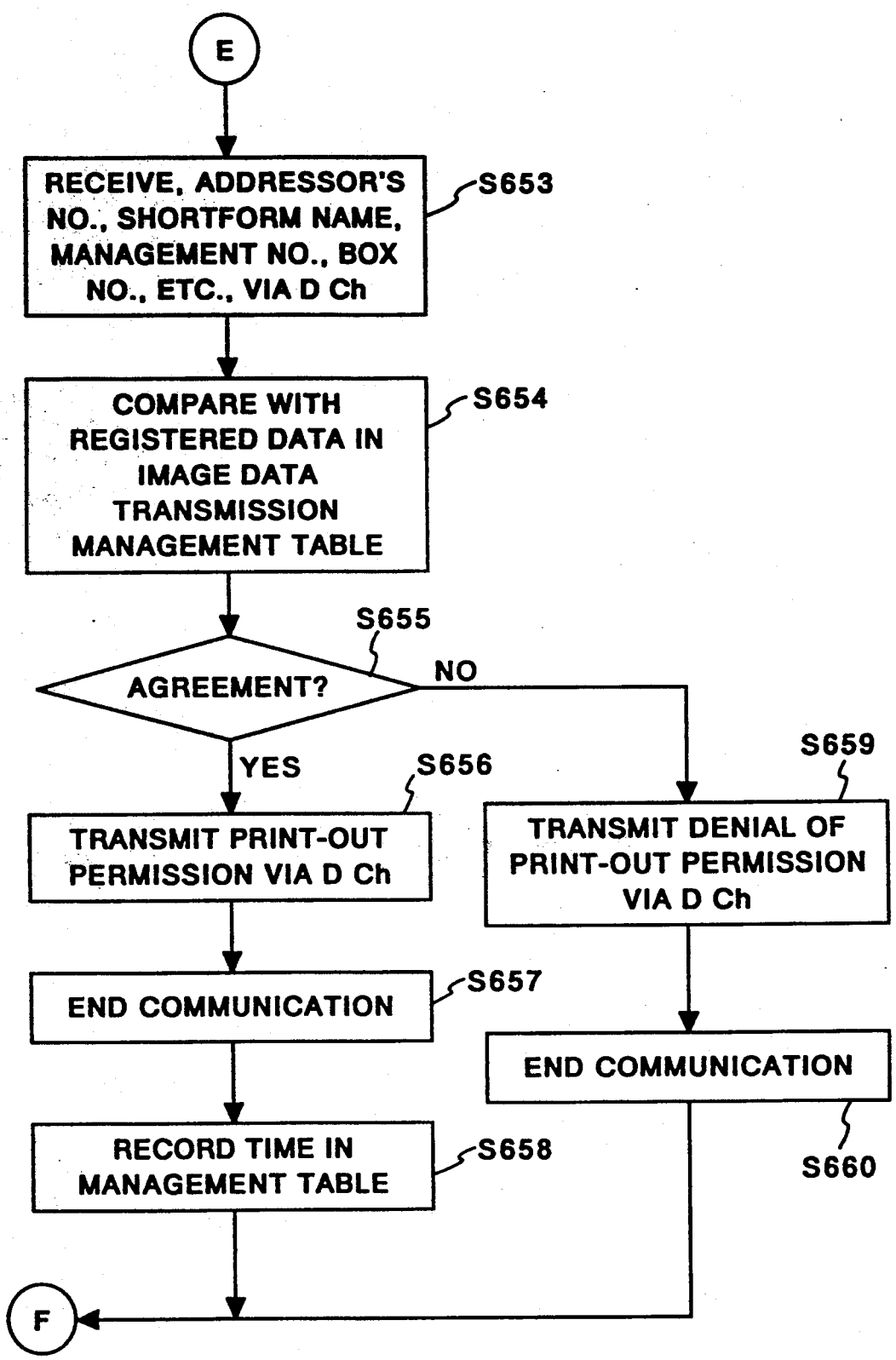
Figure 15A:
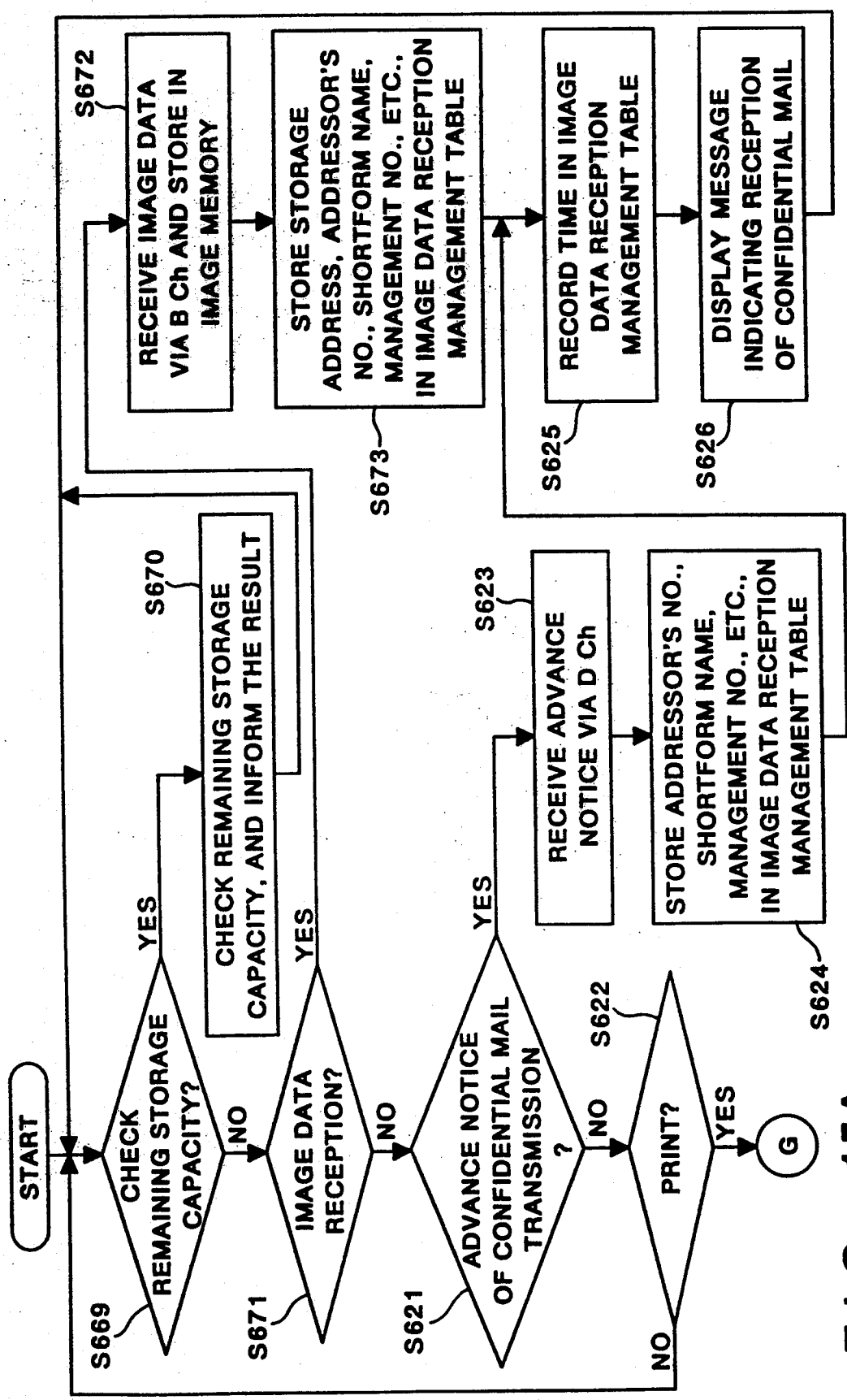
FIGS. 15A and 15B are flowcharts showing a communication protocol of an apparatus on the receiving side in the fourth embodiment.
Figure 15B:
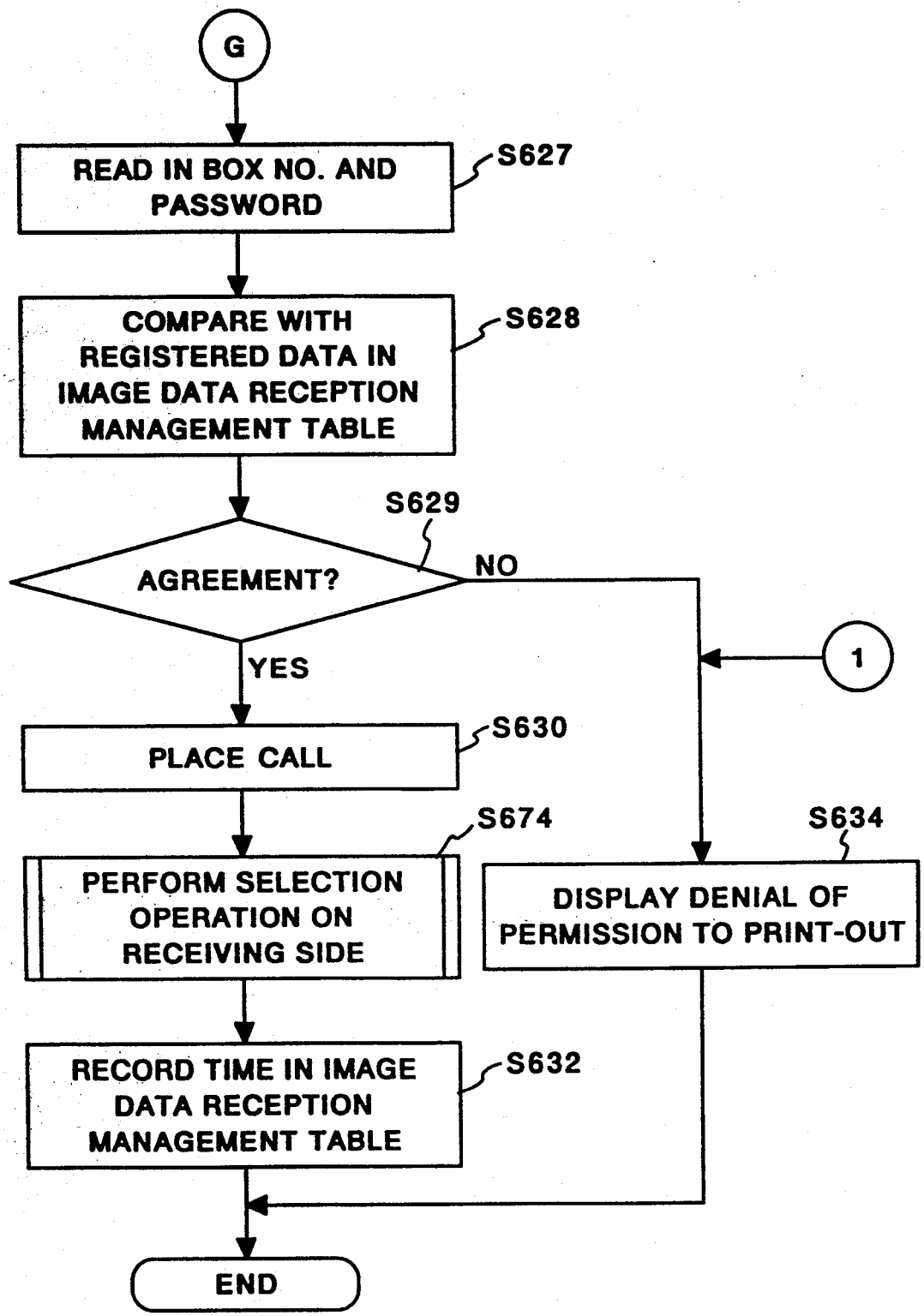
Figure 18:
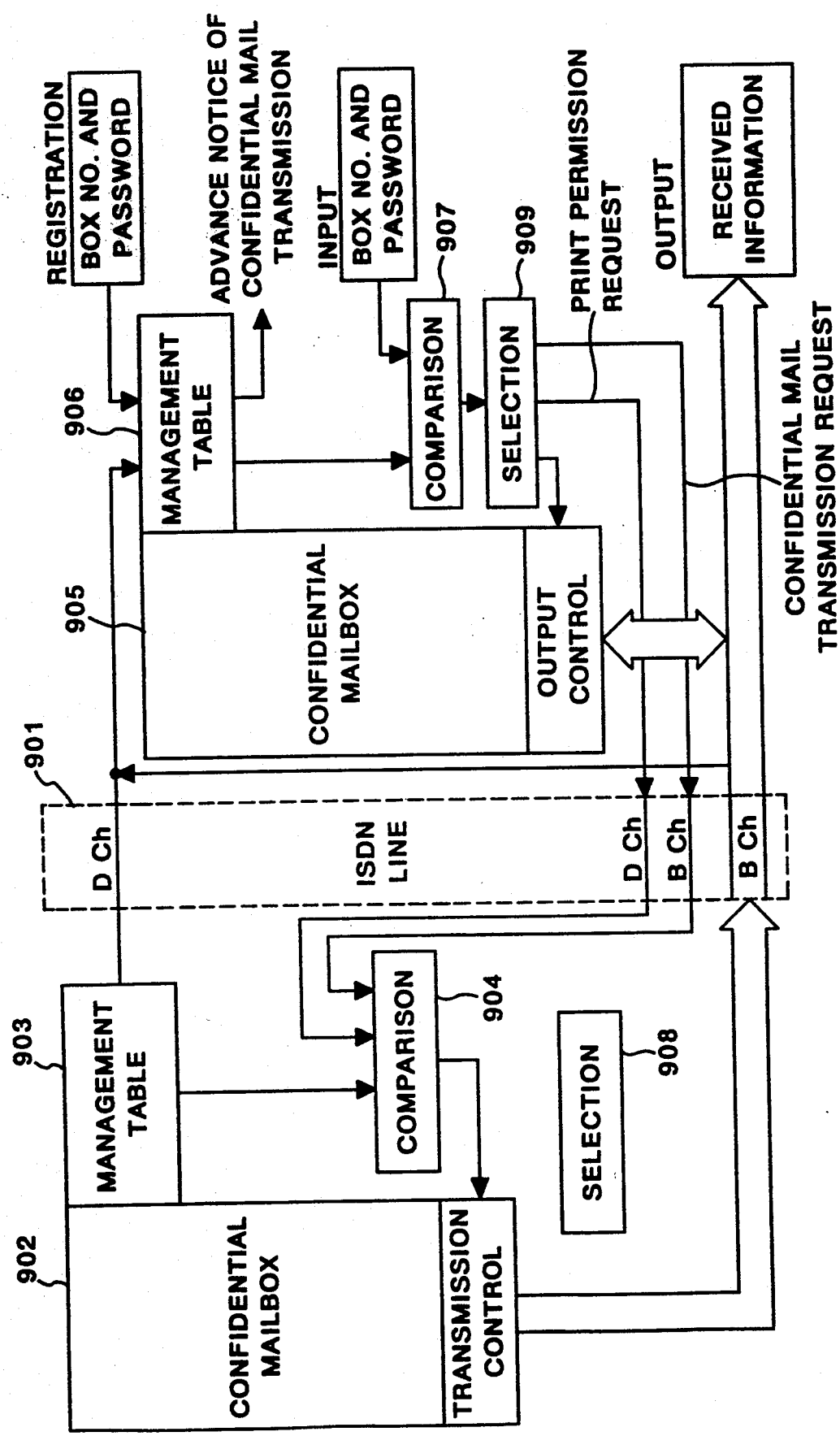
FIG. 18 is a conceptual diagram for describing the flow of information in the fourth embodiment.
Figure 19:
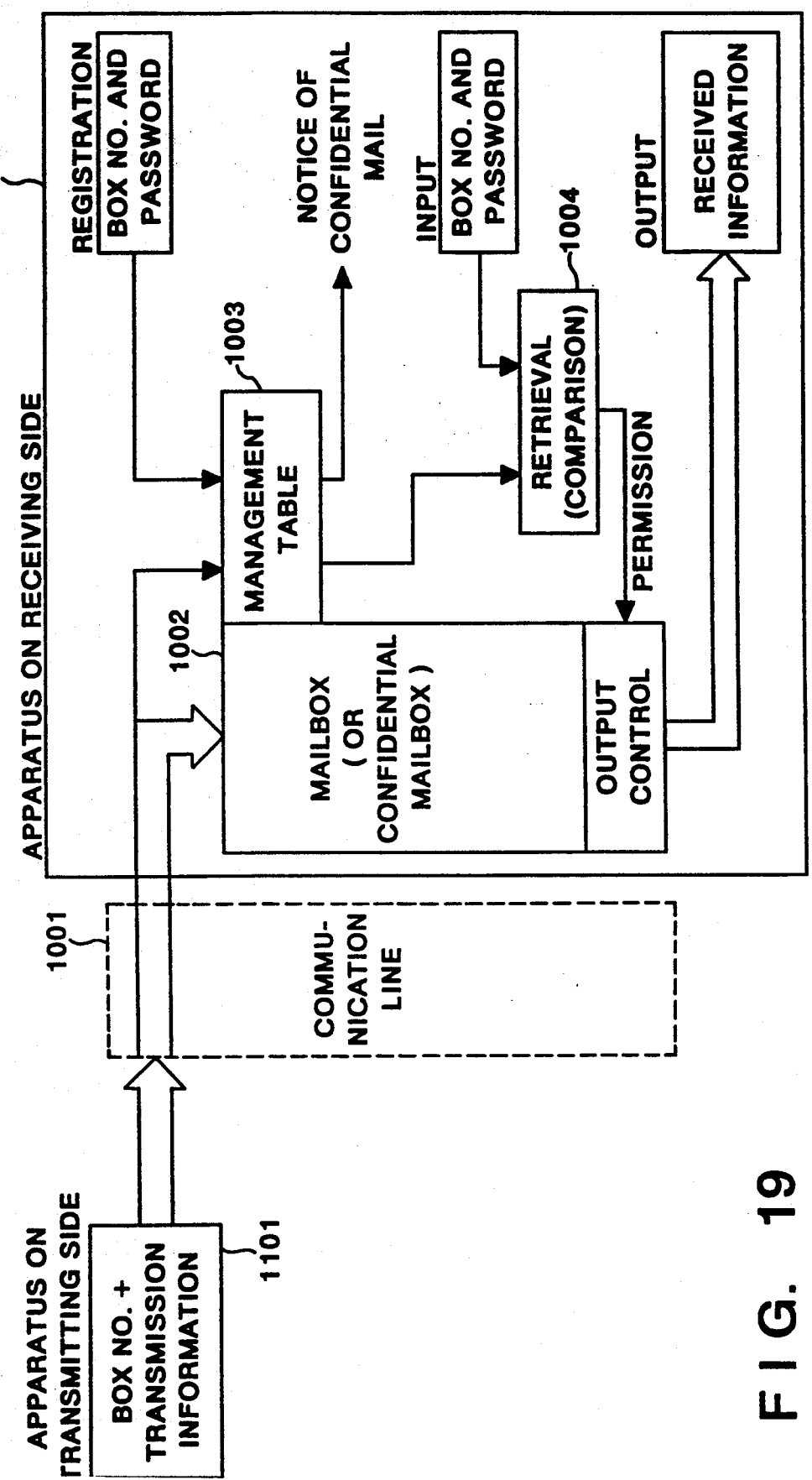
FIG. 19 is a diagram for describing reception control of a mailbox (or confidential mail) according to the prior art.

FIG. 14 is a flowchart showing a communication protocol of an apparatus on the transmitting side in a fourth embodiment, FIG. 15 is a flowchart showing a communication protocol of an apparatus on the receiving side in the fourth embodiment, and FIG. 18 is a conceptual diagram for describing the flow of information in the fourth embodiment. It should be noted that steps identical with those in FIGS. 11 and 12 are designated by like reference characters and are not described again.

In FIG. 14 for the apparatus on the transmitting side, the addressee's number in the addressee's number section 304 is read and called at step S605 for the purpose of given advance notice of a confidential mail transmission. This is followed by step S651, at which a selection operation on the transmitting side is performed.

Figure 16:
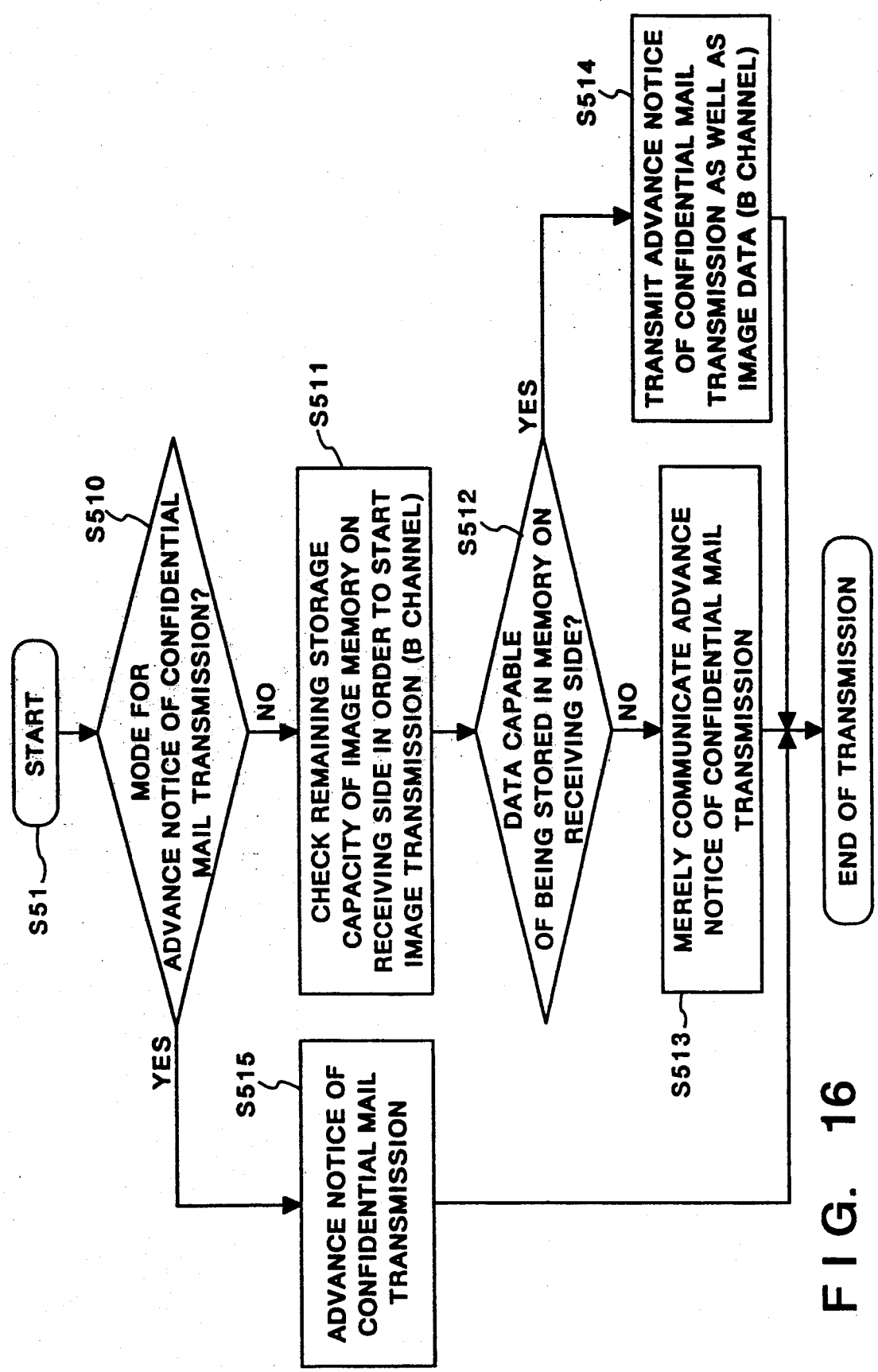
FIG. 16 is a flowchart showing a selection operation on the transmitting side.

FIG. 16 is a flowchart showing a selection operation in the apparatus on the transmitting side.

A first selection is one in which a request for confidential mail transmission is awaited from the addressee, as in the third embodiment. More specifically, when a mode for advance notice of a confidential mail transmission is selected at step S510, advance notice to the effect that a confidential mail transmission is ready is given via the D channel at step S515, and the addressor's number, the addressor's shortform name, the box number in the box number section 301 and the management number in the management number section 303 are transmitted to give notification thereof.

A second selection is one in which transmission of image data is performed without waiting for a request for confidential mail transmission from the addressee. Specifically, when the mode for advance notice of a confidential mail transmission is not selected at step S510, the program proceeds to step S511, at which it is attempted to check remaining storage capacity of image memory on the receiving side in order to start transmission of image data via the B channel in accordance with the G4 protocol. This is followed by step S512, at which it is checked to see whether the image data can be stored in the confidential mailbox of the image memory in the apparatus on the receiving side. If there is no empty space in the confidential mailbox and, hence, the image data cannot be transmitted, the program proceeds to step S513 and the image data transmission protocol is interrupted. In this case, the apparatus on the transmitting side informs the apparatus on the receiving side of the addressor's number, the addressor's shortform name, the box number in the box number section 301 and the management number in the management number section 303 before the protocol is interrupted. Thus, all that is done here is solely to communicate advance notice of confidential mail transmission. The time at which advance notice of the confidential mail transmission is communicated is recorded in the Time 1 section 308 at step S607.

If there is space in the confidential mailbox so that transmission of image data is possible, the program proceeds to step S514, at which transmission of image data via the B channel in accordance with the G4 protocol is started and the image data are stored in the confidential mailbox of the apparatus on the receiving side, after which the protocol for transmission of the image data is ended. In this case, in other words, the apparatus on the receiving side is informed of the addressor's number, the addressor's shortform name, the box number in the box number section 301 and the management number in the management number section 303 to communicate advance notice of the confidential mail transmission and, at the same time, the image data are transmitted. The time of the image data transmission is recorded in the Time 1 section 308 at step S607.

In FIG. 15 for the apparatus on the receiving side, it is checked to see whether an inquiry of checking the remaining storage capacity of the image memory is at step S669. If it is the inquiry, the program proceeds to step S670 and checks the remaining storage capacity of the image memory and informs about the result of the check to the transmitting side. If it is not the inquiry, the image data are received via the B channel and stored in the image memory 206 at step S672. A management number, which is convenient for managing the image data to be received, is assigned and stored in the management number section 403 at step S673. The addressor's number, namely the number of the party transmitting the image data, is stored in the addressor's number section 404, the addressor's shortform name is stored in the addressor's shortform name section 405, the addressor's box number, which is management information on the transmitting side, is stored in the addressor's box number section 406, and the addressor's management number is stored in an addressor's management number section 407.

A section operation on the receiving side is performed at step S674.

FIG. 17 is a flowchart showing the selection operation in the apparatus on the receiving side. The CPU 201 performs the selection operations, described below, depending upon whether image data have been stored in the confidential mailbox 206.

A first selection is for a case where advance notice of confidential mail has been communicated but the image data have not been stored in the confidential mailbox 206. More specifically, when a check is made at step S740 and it is found that a storage address for received image data has not been recorded in an image information storage address section 410, the program proceeds to step S741, at which transmission of confidential mail data is requested via the B channel in accordance with the G4 protocol. At such time the apparatus on the receiving side informs the apparatus on the transmitting side of the addressor's number, the addressor's short-form name, the box number in box number section 401, the box number in the addressor's box number section 406, and the management number in the addressor's management number section 407. These serve as a request for transmission of confidential mail.

A second selection is for a case where image data corresponding to the confidential mailbox 206 are stored in addition to advance notice of confidential mail transmission. Specifically, when the check at step S740 indicates that a storage address for received image data has been recorded in the image information storage address section 410, the program proceeds to step S742, at which a further request for permission to print the received image data is made via the B channel. At such time the apparatus on the receiving side informs the apparatus on the transmitting side of the addressor's number, the addressor's shortform name, the box number in box number section 401, the box number in the addressor's box number section 406, and the management number in the addressor's management number section 407. These serve as a request for permission to print.

When it is confirmed by a check at step S652 in FIG. 14 for the apparatus on the transmitting side that a request for confidential mail transmission has not been made, the program proceeds to step S653, at which the addressor's number, the addressor's shortform name, the box number in box number section 401, the box number in the addressor's box number section 406, and the management number in the addressor's management number section 407, which are known from the apparatus on the receiving side, are received via the D channel. These received data are compared with respective ones of the box number in the box number section 301 of the management table 108, the management number in the management number section 303, and the box number in the addressee's box number section 306. Whether the compared data agree is distinguished at step S655. In case of agreement, the program proceeds to step S656, at which print permission signal is transmitted via the D channel. Communication is completed at step S657. The time at which the print permission signal was transmitted is recorded in the Time 2 section 309.

In FIG. 17 for the apparatus on the receiving side, the permission signal is received at step S743. If permission signal is allowed at step S744, the pertinent image data in the confidential mailbox 206 are printed out. The time at which this occurs is recorded in the Time 2 section 409 at step S625.

If agreement is not obtained as a result of the comparison made at step S655 in the apparatus on the transmitting side (FIG. 14), the program proceeds to step S659 and denial of permission for print-out is transmitted via the D channel. In the apparatus on the receiving side, on the other hand, non-allowance of the permission signal is discriminated at step S744 and the program proceeds to step S634, at which a display is immediately presented to the effect that print-out is not allowed. In this case, therefore, print-out cannot take place in the apparatus on the receiving side.

The addressor is capable of confirming the circumstances of confidential mail data transmission by printing out or displaying the list constituting the management table 108 obtained in accordance with the foregoing description.

Though the apparatus on the transmitting side, the addressor, the apparatus on the receiving side and the addressee are respectively in 1:1 correspondence according to the foregoing embodiment, the invention is not limited to this arrangement. A plurality of box numbers can be set in the management tables, and management of a plurality of items of image data is possible by management number even for one and the same box number. Accordingly, similar transmission of image data is possible even if there are a plurality of apparatus on the transmitting side, a plurality of addressors, a plurality of apparatus on the receiving side, and a plurality of addressees.

Though comparison is made based on a specific password in the foregoing embodiment, it is possible for the comparison to be given a free pass if used is made of a password registered by a space, by way of example.

In the foregoing embodiment, the apparatus on the transmitting side gives advance notice of a confidential mail transmission after image data are stored in the image memory 106. However, the invention is not limited to this arrangement. For example, it is possible to have the transmitting apparatus wait with the document for transmission kept in place.

Thus, the present invention is not limited to the above-described embodiments.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus comprising:
  memory means for storing transmission management information corresponding to image data to be transmitted;
  transmitting means for transmitting as confidential information, to an apparatus on a receiving side, the image data as well as additional transmission information corresponding to the image data;
  receiving means for receiving an output permission request transmitted by the apparatus on the receiving side after the transmission by said transmitting means;
  comparing means for comparing the output permission request received by said receiving means and the transmission management information stored in said memory means; and
  output permission transmitting means for transmitting an output permission signal, which permits output of the image data, to the apparatus on the receiving side based on results of comparison performed by said comparing means.

2. The facsimile apparatus according to claim 1, wherein the transmission management information includes at least:
- a management number by which said apparatus on the transmitting side manages the image data;
- an address number which is a destination of the image data; and
- a confidential mailbox number which indicates a storage address of the image data of the apparatus on the receiving side.

3. The facsimile apparatus according to claim 2, wherein the additional transmission information includes at least:
- an addressor number for discriminating a transmitting party; and
- said management number.

4. The facsimile apparatus according to claim 1, wherein said transmitting means includes at least confidential information transmitting means for designating a confidential mailbox number which indicates a storage address, of the apparatus on the receiving side, at which the image data are stored, and transmitting.

5. The facsimile apparatus according to claim 1, wherein the output permission request includes at least:
- a management number by which said apparatus on the transmitting side manages the image data;
- an addressor for discriminating a transmitting party; and
- a confidential mailbox number which indicates a storage address of the apparatus on the receiving side at which the image data are stored.

6. A facsimile apparatus comprising:
- receiving means for receiving, from an apparatus on a transmitting side, image data designated as confidential information as well as additional transmission information corresponding to the image data;
- confidential information memory means for storing, as confidential information in a confidential mailbox, the image data and additional transmission information received by said receiving means;
- input means for inputting an image data output request so as to output the image data stored in said confidential information memory means;
- output permission requesting means for transmitting an output permission request of the image data to the apparatus on the transmitting side, when said input means inputs the image data output request; and
- confidential information output means for outputting the image data stored in said confidential information memory means based on a response to the output permission request, transmitted by said output permission requesting means, from the apparatus on the transmitting side.

7. The facsimile apparatus according to claim 6, wherein the additional transmission information includes at least:
- an addressor number for discriminating a transmitting party; and
- a management number by which the apparatus on the transmitting side manages the image data.

8. The facsimile apparatus according to claim 6, wherein said input means receives a confidential mailbox number which specifies a storage address of said memory means at which the image data are stored.

9. The facsimile apparatus according to claim 8, wherein said input means has password receiving means for receiving a password in order to cancel a secrecy safeguard.

10. The facsimile apparatus according to claim 9, wherein said confidential information output means has:
- password comparing means for comparing said password with a code registered in advance in order to safeguard secrecy; and
- retrieving means for searching said memory means based on a confidential mailbox number which specifies a storage address, of said memory means, at which the image data are stored,
- wherein said output permission requesting means transmits an output permission request for the image data to the apparatus on the transmitting side based on results of the comparison performed by said password comparing means and
- said confidential information output means outputs the image data based on a response, from the apparatus on the transmitting side, to the output permission request transmitted by said output permission requesting means, and results of the search performed by said retrieval means.

11. The facsimile apparatus according to claim 10, wherein said output permission request includes at least:
- a management number by which the apparatus on the transmitting side manages the image data;
- an addressor for discriminating a transmitting party; and
- said confidential mailbox number.

* * * * *